United States Patent [19]
Green et al.

[11] Patent Number: 5,961,833
[45] Date of Patent: Oct. 5, 1999

[54] METHOD FOR SEPARATING AND ISOLATING GOLD FROM COPPER IN A GOLD PROCESSING SYSTEM

[75] Inventors: Dennis H. Green, Arvada; Jeffrey J. Mueller, Boulder, both of Colo.

[73] Assignee: HW Process Technologies, Inc., Lakewood, Colo.

[21] Appl. No.: 08/871,176

[22] Filed: Jun. 9, 1997

[51] Int. Cl.⁶ .......................... B01D 15/04; B01D 11/00
[52] U.S. Cl. .................. 210/638; 210/639; 210/651; 423/29
[58] Field of Search .................. 210/638, 639, 210/651, 652; 423/23, 29; 75/743, 735, 733, 410, 729, 737

[56] References Cited

U.S. PATENT DOCUMENTS

| | | |
|---|---|---|
| 778,348 | 12/1904 | Anderson . |
| 996,179 | 6/1911 | Wheelock . |
| 3,816,587 | 6/1974 | Gosser ........................................ 423/29 |
| 3,928,146 | 12/1975 | Russell . |
| 4,752,363 | 6/1988 | Buckley et al. . |
| 4,824,575 | 4/1989 | Schlossel . |
| 4,880,511 | 11/1989 | Sugita . |
| 4,944,882 | 7/1990 | Ray et al. . |
| 4,971,625 | 11/1990 | Bahr ....................................... 75/118 R |
| 4,981,594 | 1/1991 | Jones . |
| 4,992,179 | 2/1991 | Brierley et al. . |
| 5,028,336 | 7/1991 | Bartels et al. . |
| 5,039,416 | 8/1991 | Loew et al. . |
| 5,041,227 | 8/1991 | van Eikeren et al. . |
| 5,112,483 | 5/1992 | Cluff . |
| 5,114,576 | 5/1992 | Ditzler et al. . |
| 5,182,165 | 1/1993 | Clough et al. . |
| 5,238,581 | 8/1993 | Frame et al. ............................ 210/748 |
| 5,254,153 | 10/1993 | Mudder .................................... 75/732 |
| 5,264,192 | 11/1993 | Shutt et al. . |
| 5,266,203 | 11/1993 | Mukhopadhyay et al. . |
| 5,310,486 | 5/1994 | Green et al. . |
| 5,372,701 | 12/1994 | Gerdon et al. . |
| 5,403,490 | 4/1995 | Desai . |
| 5,411,575 | 5/1995 | Fleming et al. .......................... 75/743 |
| 5,476,591 | 12/1995 | Green . |
| 5,587,083 | 12/1996 | Twardowski ............................ 210/652 |
| 5,766,478 | 6/1998 | Smith et al. ............................ 210/638 |

OTHER PUBLICATIONS

Suttill, K.R., "Ecuador: Potential Moving to Reality?", *Engineering and Mining Journal*, pp. 31–37 (Apr. 1996).
Bernard, G.M., "Andacollo Gold Production—Ahead of Schedule and Under Budget", *Mining Engineering*, pp. 42–47 (Aug. 1996).

(List continued on next page.)

*Primary Examiner*—W. L. Walker
*Assistant Examiner*—Richard W. Ward
*Attorney, Agent, or Firm*—Sheridan Ross P.C.

[57] ABSTRACT

A method for separating gold from copper in a gold ore processing system. Gold ore containing elemental gold and elemental copper is treated with an aqueous cyanide solution to produce a liquid product containing a gold-cyanide complex and a copper-cyanide complex. The liquid product is then delivered to a nanofiltration membrane which prevents the copper-cyanide complex from passing therethrough while allowing passage of the gold-cyanide complex. Nanofiltration of the liquid product specifically produces (1) a retentate which contains the copper-cyanide complex; and (2) a permeate which contains the gold-cyanide complex. In this manner, the gold-cyanide complex is effectively separated from the copper-cyanide complex. The permeate is then treated (e.g. with activated carbon or elemental zinc) to ultimately obtain elemental gold therefrom. The copper-cyanide complex may either be discarded or treated to recover elemental copper from the complex.

11 Claims, 2 Drawing Sheets

OTHER PUBLICATIONS

Van Zyl, D.J.A., et al., *Introduction to Evaluation, Design and Operation of Precious Metal Heap Leaching Projects*, Society of Mining Engineers, Inc., pp. 124–151 (Chapter 8 by Omar A. Muhtadi and Chapter 9 by David A. Milligan, et al.) Littleton, CO, 1988.

Harris, L., et al., "Newmont's Yanacocha Project: The Joint Venture Three Years Later", *Mining Engineering*, pp. 41–47 (Feb. 1926).

Arbiter, N., et al., *Gold—Advances in Precious Metal Recovery*, Gordon & Breach Science Publishers, New York, pp. 143–186 (1990).

Brown, T.L., et al., *Chemistry, The Central Science*, Prentice Hall, New Jersey, 4th ed., p. 815 (1988).

Information Sheet by Osmonics, Inc. of Minnetonka, MN entitled "The Filtration Spectrum" (1993).

Lien, L., "Nanofiltration: Trend of the Future?", *Water Conditioning & Purification*, pp. 24–27 (Sep. 1992).

Application Bulletin: Desal–5 107 by Desalination Systems, Inc. of Escondido, CA (Apr. 1991).

Product Summary Sheet entitled "Ultrafiltration & Microfiltration Elements" by Desalination Systems, Inc. of Escondido, CA (Apr. 1991).

Product Summary Sheet entitled "Reverse Osmosis Elements" by Desalination Systems, Inc. of Escondido, CA (Apr. 1991).

Clennell, J.E., *The Cyanide Handbook*, McGraw–Hill, pp. 102–132 (1915).

Thomas, R. (ed.), *E/MJ Operating Handbook of Mineral Processing*, McGraw–Hill, pp. 22–23 (1977).

Cheryan, M., et al., "Consider Nanofiltration for Membrane Separation", *Chemical Engineering Progress*, pp. 68–74 (Mar. 1994).

METHOD FOR SEPARATING AND ISOLATING GOLD FROM COPPER IN A GOLD PROCESSING SYSTEM

BACKGROUND OF THE INVENTION

The present invention generally relates to the processing of gold ore, and more particularly to a method in which gold ore having copper therein is treated to effectively separate gold from copper. As a result, a purified elemental gold product can be produced from impure ore materials in a highly effective and economical manner which avoids excessive reagent (e.g. cyanide) consumption.

In order to recover elemental gold (Au) from gold-containing ore, traditional methods involve treating the ore with one or more aqueous (e.g. water-containing) cyanide-containing leaching solutions, with this term encompassing a wide variety of different dissolved cyanide compounds including sodium cyanide (NaCN), potassium cyanide (KCN), and calcium cyanide [$Ca(CN)_2$]. Other cyanide-containing materials (e.g. cyanide compounds) which may be used for this purpose include but are not limited to gaseous hydrogen cyanide ($HCN_{(g)}$), ammonium cyanide ($NH_4CN$), organic alpha-hydroxy cyanides (e.g. lactonitrile), and/or thiocyanates (e.g. NaSCN, KSCN, or $Ca(SCN)_2$.) As a result, a "gold-cyanide complex" is produced during contact between the ore and the leaching solution with this term being defined to involve a chemical complex containing one or more gold ions stoichiometrically combined with at least one or more cyanide ions [$(CN)^-$]. This complex will typically consist of $Au(CN)_2^{-1}$ (also known as an "aurocyanide ion") which is associated with one or more counter-ions including, for example, $Na^+$ when NaCN is employed in the leaching solution, $K^+$ when KCN is used, and $Ca^{+2}$ when $Ca(CN)_2$ is involved. The $Au(CN)_2^{-1}$ complex has a high level of stability with a $K_f$ of about $2\times10^{38}$. A typical reaction sequence in which a gold-cyanide complex is produced using a selected cyanide ion-containing leaching solution is as follows:

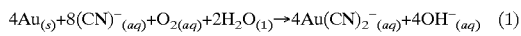

$$4Au_{(s)}+8(CN)^-_{(aq)}+O_{2(aq)}+2H_2O_{(1)} \rightarrow 4Au(CN)_2^-{}_{(aq)}+4OH^-_{(aq)} \quad (1)$$

This reaction is further described in Brown, T. L., et al., *Chemistry, The Central Science*, Prentice Hall, New Jersey, 4th ed., p. 815 (1988). It is important to emphasize that the foregoing reaction will occur when a wide variety of different cyanide-containing leaching solutions are employed, with the present invention not being restricted to the use of any particular materials for this purpose. In addition, if needed and desired as determined by preliminary testing and analysis, the cyanide-containing leaching solution is maintained at an alkaline pH (optimum=about 9–11) using lime (CaO) to maintain a high rate of gold cyanidation.

A variety of different physical methods may be employed to place the gold ore in contact with the selected cyanide-containing leaching solution. Two methods of primary commercial interest involve procedures known as (1) "heap leaching"; and (2) "vat leaching". In both of these processes, crushed gold ore is combined with the selected cyanide-containing leaching solution which is allowed to pass through the ore so that gold extraction/complex formation can take place. In heap leaching systems, individual rock-like portions of gold-containing ore are initially provided, with each portion being about 1–4 inches in diameter. The rock-like portions of ore are then placed in a pile which is typically positioned on a pad made of rubber or the like. In a representative and non-limiting embodiment, each pile is normally about 30–50 ft. tall and occupies about $1\times10^7$ to $3\times10^7$ ft$^3$ of space, although these values may be varied as needed in accordance with the size and capacity of the processing facility under consideration. The selected cyanide-containing leaching solution is then applied to the top of the ore pile and allowed to travel (e.g. percolate) downwardly therethrough. During this procedure, the leaching solution passes into the interior regions of the individual ore portions (rocks) which have a porous character. As a result, the liquid materials leaving the ore pile at the bottom thereof consist of an aqueous solution containing a gold-cyanide complex (described above). Further processing of the gold-cyanide complex to obtain elemental gold therefrom will be discussed in substantial detail below.

The foregoing procedure (e.g. placing gold ore in contact with a cyanide-containing leaching solution) may likewise be undertaken in a large containers or "vats" which are entirely or partially closed. These vats are typically constructed from stainless steel or lined carbon steel and have a representative capacity of about 400–2500 ft$^3$ in a non-limiting and preferred embodiment. Likewise, instead of using "rock"-type portions of ore as discussed above, powdered ore may also be treated in a vat or heap system as discussed in U.S. Pat. No. 5,264,192. In this embodiment, mined ore in the form of large rocks is crushed using conventional mechanical systems (e.g. jaw-crushers, roll-crushers, and/or attrition mills which are known in the art and of standard design). As a result, a powered ore product is generated which has an average particle size of about 200 U.S. standard mesh or less. The powdered ore is thereafter treated with a selected cyanide-containing leaching solution as previously noted.

Heap or vat leaching processes which incorporate cyanide extraction technology are currently in widespread use throughout the United States and in other countries. For example, in 1989, the United States had about eighty heap or vat leaching operations, with most of them being located in Nevada. Other large leaching operations currently exist in Peru, Ecuador, Chile, South Africa, Indonesia, Canada, and elsewhere.

The present invention as described in considerable detail below shall not be restricted to any specific leaching procedures (e.g. heap leaching, vat leaching, and the like), any particular cyanide-containing leaching solutions, or any physical parameters (e.g. size characteristics) associated with the gold ore being treated. The invention is applicable to any leaching method which places a cyanide-containing leaching solution in direct physical contact with gold ore to yield an aqueous product containing a gold-cyanide complex. Further general information regarding the gold leaching processes described above and operational parameters associated with these procedures (including specific examples) are presented in U.S. Pat. No. 5,264,192; Thomas, R. (ed.), *E/MJ Operating Handbook of Mineral Processing*, McGraw-Hill, Inc., pp. 22–23 (1977); Clennell, J., *The Cyanide Handbook*, McGraw-Hill, Inc. pp. 102–132 (1915); and Bernard, G. M. "Andacollo Gold Production—Ahead of Schedule and Under Budget", *Mining Engineering*, pp. 42–47 (August 1996) which are all incorporated herein by reference.

Once the desired gold-cyanide complex is generated using the processes discussed above, it must thereafter be treated to recover elemental gold therefrom. This can be done immediately or after the passage of a predetermined amount of time. While a number of different procedures may be employed for this purpose, two primary methods exist which are currently in widespread use. These methods are known as (1) the "Merrill-Crowe Process"; and (2) the "Activated Carbon Process". The Merrill-Crowe Process is described in numerous references including Arbiter, H., et al., *Gold—Advances in Precious Metals Recovery*, Gordon and Breach Science Publishers, New York, pp. 146–153 (1990); and Van Zyl, D. J. A., et al., *Introduction to Evaluation, Design and Operation of Precious Metal Heap Leaching Projects*, Society of Mining Engineers, Inc., Littleton, Colo., pp. 126–127 and 149–150 (1988) which are also incorporated herein by reference.

The Merrill-Crowe Process (which was initially developed in approximately 1897) involves a procedure in which the "pregnant" leaching solution (which contains the desired gold-cyanide complex therein) undergoes a reaction conventionally known as "zinc cementation/precipitation". Specifically, the leaching solution containing the gold-cyanide complex is combined with elemental zinc (Zn) in accordance with the following reaction:

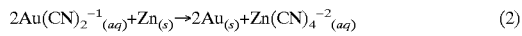

$$2Au(CN)_2^{-1}{}_{(aq)} + Zn_{(s)} \rightarrow 2Au_{(s)} + Zn(CN)_4^{-2}{}_{(aq)} \qquad (2)$$

Various lead salts (e.g. lead acetate and/or lead nitrate) may also be added to the foregoing reaction process as needed in accordance with preliminary pilot tests in order to increase the reaction kinetics of the gold precipitation process. Implementation of this technique generates solid elemental gold (Au) which resides within a gold-zinc solid sludge-type reaction product. This material is ultimately filtered and removed from the residual liquid fraction (which consists primarily of free cyanide ions [(CN)$^-$} and a dissolved $Zn(CN)_4^{-2}{}_{(aq)}$ complex.) The zinc-gold solid sludge is thereafter processed to isolate and remove elemental gold therefrom. A number of different methods may be employed for this purpose. For example, after being washed with water to remove residual free cyanide ions and $Zn(CN)_4^{-2}{}_{(aq)}$ complex, the reaction product may then be combined with sulfuric acid ($H_2SO_4$) in the presence of air in order to dissolve excess (unreacted) elemental zinc and other metals including copper and cadmium as discussed in Van Zyl, D. J. A., et al., *Introduction to Evaluation, Design and Operation of Precious Metal Heap Leaching Projects*, supra, p. 150. The remaining solid materials are thereafter washed with water again and dried. If it is determined by preliminary experimental testing that the solid product contains substantial quantities of mercury (Hg), then the product may be further processed in a conventional mercury retort at 400° C. to release residual mercury into a condenser assembly which is optimally positioned under water to avoid the release of vaporized mercury into the atmosphere. In the alternative, as discussed in Brown, T. L., et al., *Chemistry, The Central Science*, supra, p. 815, the sludge-like reaction product may be heated in air to form zinc oxide (ZnO) from residual elemental zinc which is thereafter sublimed away.

The elemental gold-containing solid product which results from the procedures listed above may then be smelted in combination with a selected flux composition which is designed to oxidize elemental zinc (as well as other residual non-gold metals) and thereby assist in the removal of metal oxides. Representative flux materials suitable for this purpose include but are not limited to "borax" (e.g. $Na_4B_4O_7 \cdot 10H_2O$) and silica (e.g. $SiO_2$) in combination. The specific flux materials and combinations thereof, as well as the amounts of these materials to be used in the smelting process will be determined in accordance with preliminary pilot studies on the gold-containing solid product being processed. Likewise, specific information on the use of flux materials in general is again presented in Van Zyl, D. J. A., et al., *Introduction to Evaluation, Design and Operation of Precious Metal Heap Leaching Projects*, supra, p. 150.

Addition of the flux materials as discussed above generates a borosilicate glass "slag", with this term being defined to involve a relatively inert reaction product created when flux materials are combined with impurities in a metal refining system. It should also be noted that, if needed as determined by preliminary pilot testing, feldspar (which comprises a silicate of aluminum and possibly other metals) may be added at approximately a 3% by weight level as a viscosity modifier.

After the steps listed above, smelting of the reaction product is initiated which takes place in a conventional furnace (e.g. a gas-fired or induction-type furnace system which is known in the art) at a temperature of approximately 1150° C. Finally, after removing the residual "slag" which gravimetrically separates and collects in the furnace, the elemental gold (characterized as "dore") is withdrawn from the furnace, thereby completing the production process. Again, this basic refining procedure is conventional in nature and discussed in substantial detail in the foregoing references including Van Zyl, D. J. A., et al., *Introduction to Evaluation, Design and Operation of Precious Metal Heap Leaching Projects*, supra.

The Activated Carbon Process employs a different approach. Specifically, the aqueous leaching product/solution having the gold-cyanide complex dissolved therein is placed in contact with activated carbon which is typically positioned in large column-like structures. The term "activated carbon" as used herein involves carbon materials having an amorphous character, a large surface area, and a considerable number of pores or "activation sites". Activated carbon which is suitable for use in this process may be obtained from the charring of coconut shells or peach pits at approximately 700–800° C. and will typically have the following optimum parameters: (1) surface area=1050–1150 $m^2/gm$; (2) apparent density=0.48 g/cc; (3) particle density= 0.85 g/cc; (4) voids in densely packed column=40%; and (5) representative particle sizes=minus 6–plus 16 mesh or minus 12–plus 30 mesh. However, the present invention and activated carbon adsorption processes in general shall not be restricted to these particular parameters which are provided for example purposes only.

Once the aqueous leaching solution containing the gold-cyanide complex therein comes in contact with the activated carbon, an adsorption process occurs which is not yet entirely understood. Specifically, the gold-cyanide complex in solution (which is defined herein to encompass aurocyanide ions, namely, $Au(CN)_2^{-1}$) is adsorbed onto the surface of the activated carbon in accordance with a number of theoretical mechanisms including the possible presence of multiple "surface oxide sites" which enable adsorption to take place. This mechanism, as well as additional information regarding the Activated Carbon Process, is presented in Arbiter, H., *Gold—Advances in Precious Metals Recovery*, supra, pp. 153–164; and Van Zyl, D. J. A., et al., *Introduction to Evaluation, Design and Operation of Precious Metal Heap Leaching Projects*, supra, pp. 128–129; 138–149; and 151 which are again incorporated herein by reference. Generally, the activated carbon supplies which are employed in this method are operated in a "fluidized bed" mode which may be achieved through the use of a liquid flow rate of about 25 gpm/ft$^2$ of cross-sectional area associated with the carbon-containing column (or other support structure) when minus 6–plus 16 mesh particles are employed. When minus 12–plus 30 mesh carbon is used, a flow rate of about 15 gpm/ft$^2$ is preferred. Both of these parameters will typically result in a bed expansion of about 60%.

Regardless of which mechanism ultimately results in adsorption of the gold-cyanide complex (e.g. aurocyanide ions) on the activated carbon, the following approach may be used to effectively removes the gold-cyanide complex from the aqueous leaching product. After adsorption, the gold-containing carbon product is filtered to remove residual "barren" liquid, followed by "desorption" or removal of the gold-cyanide complex from the "loaded" activated carbon (e.g. the gold-containing carbon product.) This is accomplished by using a selected eluant solution which is placed in direct physical contact with (e.g. passed through) the carbon. A representative eluant solution that is suitable for this purpose includes but is not limited to a solution of NaOH—NaCN (e.g. optimally about 0.5–1.0% by weight NaOH and about 0.1–0.3% by weight NaCN containing approximately 20% ethyl alcohol) as specifically mentioned in Van Zyl, D. J. A., et al., *Introduction to Evaluation, Design and Operation of Precious Metal Heap Leaching Projects*, supra, p. 139. This solution is likewise heated in a preferred embodiment to a temperature of about 77–120° C. It is theorized that cyanide ions [$(CN)^-$] in the eluant solution effectively replace/exchange the adsorbed aurocyanide ions (gold-cyanide complex) which are released into the eluant solution. The resulting gold-containing eluant product (which contains the desired gold species [aurocyanide ions/gold cyanide-complex]) is then further processed to recover elemental gold therefrom. At this point, it is important to emphasize that the overall gold concentration in the gold-containing eluant product is substantially greater than the gold concentration in the original leaching solution, thereby demonstrating the effectiveness of this procedure in producing a concentrated gold product. For example, as noted in Arbiter, H., *Gold—Advances in Precious Metals Recovery*, supra, p. 144, a representative leaching solution (after gold extraction) will have an overall gold concentration of about 1–10 ppm while an exemplary gold-containing eluant product as discussed above will comprise about 100–2000 ppm of gold therein.

At this point, the gold-containing eluant product is treated to recover elemental gold therefrom. This may again be accomplished in many ways (including zinc precipitation in accordance with the Merrill-Crowe Process as outlined above), although conventional electrowinning methods are preferred as again discussed in Van Zyl, D. J. A., et al., *Introduction to Evaluation, Design and Operation of Precious Metal Heap Leaching Projects*, supra, pp. 143–148 and 151. While electrowinning is a known procedure that has been employed in the mining industry for decades, the specific details of this process will now be summarized. First, an electrowinning "cell" is provided which includes one or more cathodes and anodes therein. Both of these elements are in fluid communication with the gold-containing eluant solution which is supplied to the cell housing having the cathodes and anodes therein. A direct current power supply is then operatively connected to the cathodes and anodes in each cell which causes the desired metal in the solution (e.g. elemental gold in the gold-containing eluant product) to be directly deposited onto the cathodes. This process shall not be restricted to any particular materials which may be used in connection with the cathodes and anodes, with a wide variety of conventional compositions being suitable for this purpose. In a representative and non-limiting embodiment, cathodes manufactured from steel wool (e.g. positioned in a plastic frame or wrapped around a stainless steel spool) and anodes produced from stainless steel, carbon, or titanium can be employed. Many different sizes, shapes, and overall design configurations may be selected in connection with the cathodes/anodes, with the claimed process (and the electrowinning procedure in general) not being restricted to any particular structures and physical parameters. Likewise, the power required for electrowinning will vary in accordance with many factors including the particular type of cell(s) under consideration, the gold concentration in the gold-containing eluant product, the construction materials associated with the cathodes/anodes, and the like. However, a representative system will involve the application of approximately 2.5 volts between the cathodes and anodes in an exemplary electrowinning cell.

Once the electrowinning process is completed, the elemental gold-containing cathodes are removed from the system and treated to recover elemental gold therefrom. The cathodes at this stage may contain up to about 50% or more gold thereon (e.g. up to about 100 oz. of elemental gold per lb. of cathode if steel wool is involved). To process the cathodes, they may initially be placed in contact with sulfuric acid ($H_2SO_4$) in an optional pretreatment step which is designed to dissolve any residual non-gold metals including copper, iron, and the like. The need for a sulfuric acid pretreatment stage is typically determined in accordance with preliminary pilot studies on the electrowinning products (e.g. cathodes) under consideration. Likewise, if the cathodes contain substantial amounts of mercury (which will not usually be removed by sulfuric acid treatment), they may be subjected to conventional retort processes as discussed above. The cathodes are then smelted in combination with one or more selected flux compositions which are again designed to oxidize residual non-gold metals and thereby assist in the removal of metal oxides. Representative flux compounds suitable for this purpose include but are not limited to "borax" (e.g. $Na_4B_4O_7.10H_2O$) and silica (e.g. $SiO_2$) in combination. The specific flux materials and combinations thereof, as well as the amounts of these materials to be used in the smelting process will be determined in accordance with preliminary pilot studies on the gold-containing cathode materials under consideration. More detailed information on the use of flux materials for this purpose is again presented in Van Zyl, D. J. A., et al., *Introduction to Evaluation, Design and Operation of Precious Metal Heap Leaching Projects*, supra, pp. 150–151. Addition of the flux materials results in the production of a borosilicate glass "slag" with this term being defined above. It should also be noted that, if needed as determined by preliminary pilot testing, feldspar may be added at approximately a 3% by weight level as a viscosity modifier.

After the steps listed above, smelting of the cathodes is initiated which takes place in a conventional furnace (e.g. a gas-fired or induction-type furnace system that is known in the art) at a temperature of approximately 1150° C. Finally, after removing the residual "slag" which gravimetrically separates and collects in the furnace, the elemental gold (e.g. characterized as "dore") is withdrawn from the furnace, thereby completing the production process. Again, this basic refining procedure is conventional in character and discussed in the references listed above.

Both the Merrill-Crowe Process and the Activated Carbon Process involve established procedures for collecting and isolating gold-containing species (e.g. aurocyanide ions) from cyanide-based leaching solutions so that elemental gold can be recovered. Further information regarding these procedures will be presented below in the Detailed Description of Preferred Embodiments section. It is likewise important to emphasize that the present invention shall not be restricted to any particular gold collection/isolation techniques. The claimed method is instead prospectively applicable to any technique for obtaining an elemental gold product from cyanide solutions used in heap leaching processes, vat leaching methods, and other cyanide-based extraction systems. For example, in addition to the Merrill-Crowe Process and the Activated Carbon Process (which are both preferred), other representative methods of a conventional nature which may be employed to collect and isolate gold-cyanide complexes (e.g. aurocyanide ions), following by additional purification to yield elemental gold include (1) solvent extraction procedures which use alkyl phosphorus esters, as well as primary, secondary, tertiary, and/or quaternary amines (alone or combined with phosphine oxides, sulfones, and/or sulfoxides) to extract gold-cyanide complex materials from leach solutions; and (2) ion exchange methods and compositions (e.g. resins) in which aurocyanide ions are extracted from cyanide-based leaching solutions, with representative elution materials suitable for use with these compositions including sodium hypochlorite, zinc cyanide, thiocyanate, a mixture of thiocyanate/dimethyl formamide ("DMF"), and the like. Exemplary ion exchange resins which may be employed for this purpose include those sold under the trademark DOWEX and others which are commercially available from the Dow Chemical Company of Midland, Mich. (USA). Both of these gold isolation methods (combined with conventional electrowinning and smelting processes as discussed above) represent alternative procedures which may be employed to isolate and collect elemental gold from cyanide-containing leaching solutions. These alternative techniques are discussed in Arbiter, H., *Gold—Advances in Precious Metals Recovery*, supra, pp. 164–185. In accordance with the information provided above, the present invention shall therefore not be restricted to any particular methods for isolating elemental gold from leaching solutions containing gold-cyanide complexes therein, with the versatility of the claimed process becoming readily apparent from the specific information provided below in the Detailed Description of Preferred Embodiments section.

Regardless of which methods are ultimately used to obtain elemental gold from gold-cyanide complexes, numerous technical and economic problems can result in various portions of the leaching system when gold ore is processed which contains substantial amounts of elemental copper. Copper-containing gold ore is obtainable from many countries throughout the world including Australia, Chile, Philippines, Saudi Arabia, Canada, Argentina, Indonesia, Peru, and Mexico. Significant problems will result when the copper-containing gold ore contains about 0.1–2.0% by weight elemental copper or more, although the claimed process shall not be limited to the treatment of ore containing any particular copper levels. In all cyanide-based leaching processes (including heap leaching and vat leaching systems), material costs represent a substantial portion of the overall operating expense in the processing of gold ore. These material costs are primarily associated with the cyanide-containing leaching solution as discussed above. The excessive consumption of cyanide materials during ore treatment will substantially reduce the operating efficiency of the entire gold production facility. It is therefore a goal of all cyanide based leaching operations to minimize the use of cyanide compositions (e.g. cyanide salts dissolved in aqueous solutions) and to avoid excessive losses of these materials.

However, when copper is present in the gold ore as indicated above, a chemical "side-reaction" occurs which results in excessive consumption and losses of the cyanide-containing leaching solution. Undesired and excessive consumption of cyanide ions [$(CN)^-$] which takes place when elemental copper is present in the gold ore involves the following chemical reaction:

$$2Cu_{(s)} + 6(CN)^-_{(aq)} \rightarrow 2Cu(CN)_3^{-2}_{(aq)} \quad (3)$$

This reaction consumes substantial amounts of free cyanide [$(CN)^-$] in order to produce a copper-cyanide complex, thereby increasing the overall cyanide requirements in the leaching process. The term "copper-cyanide complex" as used herein shall be defined to involve a chemical complex containing one or more copper ions stoichiometrically combined with at least one or more cyanide ions [$(CN)^-$]. This complex will primarily consist of $Cu(CN)_3^{-2}$ (also known as a "cuprocyanide ion") which is associated with one or more counter-ions including, for example, $Na^+$ when NaCN is employed in producing the leaching solution, $K^+$ when KCN is used, and $Ca^{+2}$ when $Ca(CN)_2$ is involved. Much of the copper-cyanide complex ($Cu(CN)_3^{-2}$) which is generated as a result of this reaction passes unaffected through the gold extraction and isolation processes outlined above, and ultimately resides in the "barren" cyanide-containing solution materials which remain after the gold-cyanide complex is removed. This barren solution is normally reused/recycled in treating incoming amounts of additional gold ore. However, when the barren solution contains the copper-cyanide complex therein, this material ($Cu(CN)_3^{-2}$) decomposes via oxidation or other processes to $Cu(CN)_2^{-1}$ during exposure to air, bacterial action, and/or sunlight in storage ponds, on heaps of gold ore, and the like. This copper-cyanide compound ($Cu(CN)_2^{-1}$) represents a considerable problem in the recycled barren cyanide solution since $Cu(CN)_2^{-1}$ is chemically incapable of extracting gold from gold ore to yield the desired gold-cyanide complex and recombines with fresh cyanide ions [$(CN)^-$] that are added during the reuse and recycling of the barren solution. The $Cu(CN)_2^{-1}$ is then reconverted back into the copper-cyanide complex ($Cu(CN)_3^{-2}$), thus consuming two moles of $(CN)^-$. As more copper leaches into the recirculating leaching solution (which occurs during reuse of this material and repeated passage thereof through incoming quantities of gold ore), increasingly large amounts of cyanide are irreversibly lost to this decomposition/$(CN)^-$ consumption cycle. The presence of copper in the gold ore being treated therefore presents significant problems from a functional and economic standpoint.

In summary, the presence of elemental copper in the gold ore being treated ultimately increases cyanide consumption in the system by forming a copper-cyanide complex ($Cu(CN)_3^{-2}$) which can decompose to yield $Cu(CN)_2^{-1}$. The $Cu(CN)_2^{-1}$ in the recycle stream, when "conditioned" by the addition of fresh $(CN)^-$ is reconverted to $Cu(CN)_3^{-2}$ resulting in the loss of two moles of $(CN)^-$ to the inert $Cu(CN)_3^{-2}$ compound. This loss (which involves excessive $(CN)^-$ reagent consumption) significantly and adversely affects the cost efficiency of the entire gold processing operation.

In addition to excessive cyanide consumption, copper materials within the gold ore will also result in an increasingly impure elemental gold product. Additional and more costly refining procedures must therefore be employed to solve this problem. Likewise, if the Merrill-Crowe Process is used (which involves a combination of elemental zinc with the leaching solution containing the gold-cyanide complex), extraneous copper materials in the solution will dramatically reduce the precipitation efficiency of the system by causing zinc passivation, with the term "passivation" involving a process in which the zinc is rendered non-reactive to the gold-cyanide complex which prevents the gold precipitation process from taking place. Additional zinc will therefore be required which again increases overall production costs. Excessive copper contamination of the leaching solution will also reduce the operating efficiency of the smelting process associated with this embodiment by causing prolonged smelting times. In systems which employ the Activated Carbon Process, copper materials (e.g. copper-cyanide complexes) will substantially inhibit the functional capabilities of the activated carbon, thereby "fouling" this material and causing increased carbon requirements. Current efficiency and consumption are likewise increased in subsequent electrowinning stages if copper materials are not removed from the system. Accordingly, the presence of copper-containing species in the leaching solution after the treatment of gold ore will cause a number of significant problems unless the copper is effectively removed.

The present invention involves a unique and specialized procedure for removing undesired copper (e.g. copper-cyanide complexes) from gold extraction systems when copper-containing gold ore is being processed. As a result, production costs are greatly reduced which contributes to a substantial increase in overall operating efficiency. The claimed process is readily applicable to a wide variety of cyanide-based treatment methods ranging from heap leaching to vat leaching. It may also be used with many different methods for isolating elemental gold from gold-cyanide complexes including the Merrill-Crowe Process, the Activated Carbon Process, and others. The claimed method is highly versatile, satisfies a long-felt need in the gold processing industry, and provides the following important benefits: (1) the ability to process impure, copper-containing gold ore in an economical manner without the excessive consumption of cyanide compositions (e.g. free cyanide $[(CN)^-]$); (2) an improvement in the operating efficiency of the entire gold processing system by reducing cyanide reagent costs; (3) the decreased consumption of other reagents in the system including activated carbon and zinc (depending on the particular recovery system under consideration); (4) a reduction in electricity consumption (if electrowinning is part of the overall processing system); (5) improved conservation of resources and reduced waste generation which collectively provide important environmental benefits; (6) a reduction in the amount of smelting time that is needed to yield an elemental gold product; (7) the ability to retain, purify, and collect elemental copper from the gold ore which can be sold at considerable economic benefit; (8) a high level of versatility and applicability to a wide variety of different cyanide-based processing methods; (9) improved gold purity levels in connection with the gold product "dore"; and (10) a general improvement in the simplicity, effectiveness, and efficiency of the gold production system. For these reasons and the other factors outlined below, the present invention and its various embodiments represent a significant advance in the art of gold refining.

Summary of the Invention

It is an object of the present invention to provide a method for separating gold from copper in a gold processing system which enables the removal of copper from the system in a rapid and efficient manner.

It is another object of the invention to provide a method for separating gold from copper in a gold processing system which is readily applicable to a wide variety of cyanide-based ore treatment systems and methods for converting gold-cyanide complexes into elemental gold.

It is another object of the invention to provide a method for separating gold from copper in a gold processing system which enables the purity levels of elemental gold to be substantially improved.

It is a further object of the invention to provide a method for separating gold from copper in a gold processing system wherein the removal of copper is accomplished in a manner which enables the reduced consumption of cyanide materials so that the overall efficiency of the system is improved.

It is a further object of the invention to provide a method for separating gold from copper in a gold processing system which is accomplished in situ (e.g. "on-line") without any substantial interruptions in system operation and without significant modifications to the system.

It is a still further object of the invention to provide a method for separating gold from copper in a gold processing system which not only facilitates the removal of copper so that the foregoing benefits can be achieved, but likewise enables the removed copper species to be treated so that elemental copper can be recovered therefrom.

It is an even further object of the invention to provide a method for separating gold from copper in a gold processing system in which the benefits described above are accomplished through the use of nanofiltration membrane technology which represents a new and unique method for separating metals in gold recovery systems.

The present invention involves a highly effective method for treating gold ore which also contains elemental copper therein as an impurity. The claimed process enables copper materials leached from the ore to be removed from the treatment system (e.g. separated from the gold-containing species). As a result, a number of problems are avoided which typically result when copper remains in the system. These problems are described above and range from the production of elemental gold having reduced purity levels to the excessive consumption of cyanide caused by the formation of $Cu(CN)_2^{-1}$ in the system which is ultimately converted into $Cu(CN)_3^{-2}$. This process "ties up" "free" cyanide $[(CN)^-]$ which provides many economic disadvantages. Excessive cyanide consumption substantially reduces the overall operating effectiveness of the entire production system. Likewise, the presence of undesired copper in the system can interfere with the conversion of gold-cyanide complexes produced during the cyanide leaching process into elemental gold when conventional production methods are employed (e.g. the zinc-based Merrill-Crowe Process or the Activated Carbon Process as previously discussed.) The presence of copper materials (e.g. copper-cyanide complexes) in the system can also interfere with the efficiency of smelting and/or electrowinning procedures which are ultimately used to recover elemental gold from the gold-cyanide complexes. It is therefore desirable from both a technical and practical standpoint to remove copper from the processing system for all of the reasons given above.

The claimed process overcomes the problems outlined above in a very effective manner which will become readily apparent from the detailed information presented below. While specific processing systems and gold recovery technologies will be discussed in connection with the claimed procedure, the present invention shall not be limited to any particular cyanide-based gold extraction methods. Instead, the invention is prospectively applicable to any production system which places gold ore in physical contact with solutions containing free cyanide ions $[(CN)^-]$ therein so that a gold-cyanide complex as defined above is generated. Accordingly, the claimed process shall not be restricted to any specific gold processing operations provided that, in some manner, cyanide solutions are used to chemically extract gold from mined ore so that a gold-cyanide complex is created.

A brief overview of the present invention and its main features will now be provided. More specific details regarding the invention including specific reagents, operational parameters, processing sequences, and equipment will be presented below in the Detailed Description of Preferred Embodiments section. It should also be noted that, unless otherwise indicated herein, the claimed invention shall not be limited to any particular numerical parameters, reagent quantities, and other values which may be determined in accordance with preliminary pilot studies on the gold ore being treated.

The present invention basically involves a gold separation and recovery process which uses a cyanide-containing leaching solution to extract gold from gold ore. The ore being processed in the present case likewise contains elemental copper therein (along with elemental gold) which must be removed to achieve the benefits listed above. As previously indicated, unless the copper materials leached from the ore are removed during subsequent processing, the presence of copper in the system will cause numerous problems ranging from the production of elemental gold having reduced purity levels to the excessive consumption of cyanide caused by the formation of $Cu(CN)_2^{-1}$ in the system which is ultimately converted into $Cu(CN)_3^{-2}$. The claimed method effectively removes undesired copper materials (e.g. copper-cyanide complexes) at the early stages of production in a rapid and efficient manner.

In accordance with the invention, a supply of gold ore which comprises both elemental gold and elemental copper therein is initially provided (either in small rock-like portions or in powder form). The gold ore is thereafter placed in direct physical contact with a leaching solution comprising cyanide therein. As discussed in considerable detail below, this particular stage may be accomplished using either conventional heap-leaching or vat-leaching techniques. Likewise, the cyanide-containing leaching solution shall be defined to encompass an aqueous solution comprising cyanide ions $[(CN)^-]$ therein in combination with a selected counter-ion (e.g. $Na^+$, $K^+$, $Ca^{+2}$, and the like). Representative leaching solutions suitable for this purpose will contain a dissolved cyanide compound (salt) therein, with representative examples of this material including but not limited to sodium cyanide (NaCN), potassium cyanide (KCN), calcium cyanide ($Ca(CN)_2$), gaseous hydrogen cyanide ($HCN_{(g)}$), ammonium cyanide ($NH_4CN$), organic alpha-hydroxy cyanides (e.g. lactonitrile), thiocyanates (e.g. NaSCN, KSCN, or $Ca(SCN)_2$) and mixtures thereof. When the cyanide-containing leaching solution comes in physical contact with the gold ore, it extracts both gold and copper from the ore in order to generate a liquid product containing a gold-cyanide complex ($Au(CN)_2^{-1}$) and a copper-cyanide complex ($Cu(CN)_3^{-2}$) as outlined in specific detail below. The liquid product will typically include about $1 \times 10^{-3} - 1 \times 10^{-4}\%$ by weight gold-cyanide complex and about 0.05–1.0% by weight copper-cyanide complex although these values are subject to change in accordance with the particular type, grade, and character of gold ore being processed.

In a preferred embodiment of the invention, a unique processing and separatory stage is provided which is designed to separate the gold-cyanide complex from the copper-cyanide complex so that both of these materials can be isolated from each other. Specifically, at least one separatory structure known as a "nanofiltration membrane" is provided for this purpose. It has been discovered in accordance with the claimed invention that a nanofiltration membrane is capable of preventing the copper-cyanide complex from passing through the membrane while allowing the gold-cyanide complex to pass. In this manner, one or more nanofiltration membranes may be employed to effectively separate the gold-cyanide complex in the liquid product from the copper-cyanide complex in a highly effective and rapid manner at minimal cost. This membrane-based system which is used to remove copper-containing species in a gold processing operation represents a considerable advance in the art of gold production. Likewise, further information will be provided below regarding the special characteristics of nanofiltration membranes which enable the gold-copper separation process to be achieved. It will become readily apparent from the discussion of nanofiltration technology presented in the Detailed Description of Preferred Embodiments that nanofiltration membranes are considerably different in structure, function, and capability from other membrane types including reverse osmosis and ultrafiltration membranes.

Next, the liquid product which contains both the gold-cyanide complex and copper-cyanide complex is delivered to the selected nanofiltration membrane so that the liquid product flows onto the nanofiltration membrane in order to produce a retentate and a permeate. In a representative and preferred embodiment, the liquid product is delivered to the nanofiltration membrane at a preferred and optimum flow rate of about 100–10,000 GPM (gallons per minute), although this value may be varied as needed in accordance with preliminary pilot studies involving the particular system under consideration and its overall capacity. The retentate does not pass through the nanofiltration membrane while the permeate passes through the membrane. The retentate specifically contains the copper-cyanide complex therein while the permeate includes the gold-cyanide complex. In this manner (and in accordance with the unique character of the present invention) the gold-cyanide complex is effectively separated from the copper-cyanide complex.

As previously noted, the nanofiltration membrane allows the permeate (e.g. the gold-cyanide complex) to pass therethrough. Passage of the permeate through the nanofiltration membrane typically occurs at an optimum and non-limiting membrane flux rate of about 2–20 GFD [gallons per $ft^2$ per day]), although this parameter may be suitably varied as needed in accordance with routine preliminary testing. Finally, the permeate is collected and retained (or further processed if desired), followed by the treatment thereof to ultimately obtain elemental gold from the gold-cyanide complex in the permeate. The terms "treatment" and "treating" as applied to the permeate in connection with the recovery of elemental gold therefrom may comprise a number of conventional procedures and shall not be restricted to any particular gold isolation techniques. For example, one treatment method of interest involves a procedure known as the Merrill-Crowe Process which is extensively discussed above. In accordance with this method (which basically constitutes a "substitution"-type zinc cementation reaction), the permeate (which contains the gold-cyanide complex) is combined with a supply of elemental zinc to produce a reaction product which comprises precipitated elemental gold therein along with a liquid fraction containing (1) water; (2) free cyanide ions $[(CN)^-]$; and (3) small amounts of a zinc-cyanide complex $[Zn(CN)_4^{-2}]$. Thereafter, the elemental gold is removed from the reaction product by conventional means as discussed above including the controlled smelting of the reaction product. Likewise, the liquid fraction can be removed from the reaction product (e.g. by conventional filtration or decantation methods) and thereafter re-used in treating incoming amounts of gold ore which contain both elemental gold and copper therein. Additional information concerning the Merrill-Crowe Process is discussed above and will be further addressed in the Detailed Description of Preferred Embodiments section. Likewise, a description of this process is provided in numerous references including Arbiter, H., *Gold—Advances in Precious Metals Recovery*, Gordon and Breach, supra, pp. 146–153; and Van Zyl, D. J. A., et al., *Introduction to Evaluation, Design and Operation of Precious Metal Heap Leaching Projects*, supra, pp. 126–127 and 149–150 which are again incorporated herein by reference.

Another treatment method of interest involves a procedure conventionally known as the Activated Carbon Process which is likewise described in considerable detail above. This technique basically involves placing the permeate containing the gold-cyanide complex in contact with a supply of activated carbon. The activated carbon then extracts the gold-cyanide complex (e.g. aurocyanide ions, namely, $Au(CN)_2^{-1}$) from the permeate, with these ions being adsorbed on the activated carbon to yield a gold-containing carbon product. The resulting liquid fraction which remains after extraction of the gold-cyanide complex (e.g. after passage of the permeate through the activated carbon) contains free cyanide [$(CN)^-$] therein. If desired, this material can be collected and removed from the gold-containing carbon product (e.g. by conventional filtration, decantation, or gravimetric methods) and thereafter re-used in treating incoming amounts of gold ore which contain both elemental gold and copper therein. Next, the gold-cyanide complex is removed from the gold-containing carbon product and further processed in a conventional manner to yield elemental gold. As specifically outlined below, a representative and preferred processing method for accomplishing this goal involves applying at least one eluant (stripping) solution to the gold-containing carbon product in order to strip the gold-cyanide complex from the gold-containing carbon product. This step specifically yields a gold-containing eluant product in liquid form which contains the gold-cyanide complex dissolved therein. The gold-containing eluant product is thereafter treated to recover elemental gold therefrom, preferably by subjecting the gold-containing eluant product to electrical current in a conventional electrowinning apparatus so that elemental gold is plated onto one or more cathodes in the apparatus. The gold-containing cathodes are then smelted as previously discussed to obtain a final elemental gold product. Further information regarding the Activated Carbon Process will be outlined in the Detailed Description of Preferred Embodiments section. Likewise a description of this process is provided in numerous references including Arbiter, H., *Gold—Advances in Precious Metals Recovery*, supra, pp. 153–163; and Van Zyl, D. J. A., et al., *Introduction to Evaluation, Design and Operation of Precious Metal Heap Leaching Projects*, supra, pp. 128–12; 138–149; and 151 which are again incorporated herein by reference.

The claimed process which involves the use of nanofiltration technology to separate gold materials from copper compositions shall not be restricted to any particular method for collecting and isolating gold-containing species (e.g. aurocyanide ions) from the liquid product (the "leachate") to ultimately produce elemental gold. Other representative methods suitable for this purpose include (1) solvent extraction procedures which use alkyl phosphorus esters, as well as primary, secondary, tertiary, and/or quaternary amines (alone or combined with phosphine oxides, sulfones, and/or sulfoxides) to extract gold-cyanide complex materials from leach solutions; and (2) ion exchange methods and compositions (e.g. resins) in which aurocyanide ions are extracted from cyanide-based leaching solutions, with representative elution materials suitable for use with these compositions including sodium hypochlorite, zinc cyanide, thiocyanate, a mixture of thiocyanate/dimethyl formamide ("DMF"), and the like. Accordingly, the present invention is prospectively applicable to a number of alternative methods and procedures for ultimately isolating, refining, and collecting elemental gold as a final product.

Finally, an additional optional step in the claimed process involves treating the copper-cyanide complex in the membrane retentate to recover elemental copper therefrom. Specific methods for accomplishing this goal will be outlined below in the Detailed Description of Preferred Embodiments section. However, a basic and conventional method for doing so involves the addition of a selected acid (e.g. sulfuric acid [$H_2SO_4$]) to the retentate. As a result, a precipitation reaction occurs in which the copper-cyanide complex is precipitated as solid CuCN, with free cyanide ions [$(CN)^-$] being converted to $HCN_{(aq)}$. This basic procedure is discussed in U.S. Pat. No. 996,179 which is incorporated herein by reference. The solid CuCN may thereafter be processed in accordance with a number of conventional methods to obtain elemental copper, with the claimed invention not being restricted to any particular recovery techniques. For example, representative procedures for achieving this goal include reduction roasting with $H_2$ gas to yield a "copper sand" that is subsequently smelted.

Alternatively, a procedure may be employed in which the copper-cyanide complex in the membrane retentate is acidified as noted above along with the addition of sodium sulfide ($Na_2S$) to yield a $Cu_2S$ precipitate. This material may then be smelted to obtain a final elemental copper product. Further detailed information concerning this particular process will be discussed below and is outlined in U.S. Pat. No. 778,348 which is also incorporated herein by reference. It is again important to emphasize that this portion of the claimed process (e.g. treatment of the copper-cyanide complex to recover elemental copper therefrom) is optional and may involve many known copper recovery techniques for this purpose, with the present invention not being restricted to any particular copper recovery methods or the recovery of copper in general. Alternatively, instead of processing the copper-cyanide complex as outlined above, this material (e.g. the retentate) may be discarded in a suitable manner.

The claimed gold-copper separation method provides excellent results and enables a highly purified elemental gold product to be obtained from impure, copper-containing gold ore using a minimal amount of equipment, reagents, and labor. It likewise allows effective conservation of cyanide-containing species (e.g. free cyanide ions [$(CN)^-$]) by effectively removing the copper-cyanide complex from the system. Removal of the copper-cyanide complex in this manner avoids the formation of $Cu(CN)_2^{-1}$ in the system which is ultimately converted into $Cu(CN)_3^{-2}$. This undesired side-reaction (which is prevented by the present invention) consumes large amounts of "free" cyanide [$(CN)^-$] and is therefore undesirable. The elimination of copper-containing species (e.g. the copper-cyanide complex) from the system also prevents the interference of this material with subsequent processing steps including electrowinning and smelting stages. As a result, "impure" gold ore (which was previously considered economically undesirable from a treatment standpoint) can be processed in a cost-effective manner. Finally, it is important to emphasize that the present invention does not simply involve a membrane separation method for metal ions per se. It is instead directed to the use of a very specific membrane system (e.g. one or more nanofiltration membranes) in a particular application. This application involves the differential separation of gold from copper in a gold ore processing system wherein gold is allowed to pass through the membrane system while copper is blocked. For this reason and the other factors outlined below, the claimed invention represents an important development in the art of gold ore treatment.

These and other objects, features, and advantages of the invention shall be discussed further below in the following Brief Description of the Drawings and Detailed Description of Preferred Embodiments.

DETAILED DESCRIPTION OF PREFERRED EMBODIMENTS

Figure 1:
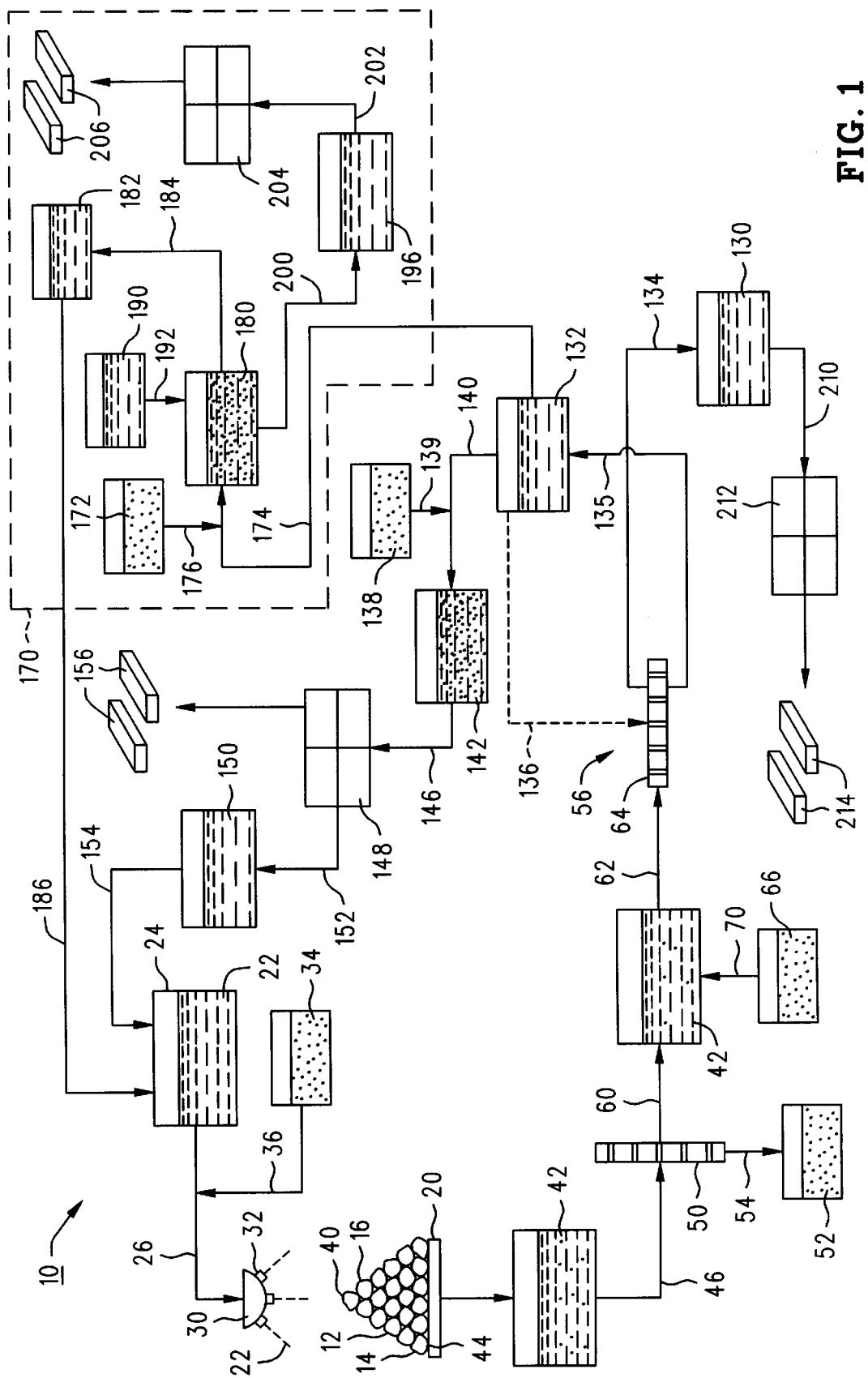
FIG. 1 is a schematic flow diagram illustrating the various process steps, stages, and materials which are used in accordance with the present invention to effectively separate copper from gold in a cyanide-based gold processing system.

In accordance with the present invention, a unique and highly efficient method is disclosed for removing copper-containing materials (e.g. copper-cyanide complexes) from a cyanide-based gold-processing system. The claimed method is particularly designed for use in connection with gold ore which includes both elemental gold and elemental copper therein. Following the initial cyanide leaching stage as discussed below, the invention uses a unique membrane-based approach to remove copper-cyanide complexes from the system while allowing gold-cyanide complexes to remain therein for subsequent processing. Removal of the copper-cyanide complexes from the processing system provides many benefits including the more efficient production of a highly purified elemental gold product and the conservation of materials within the system. Regarding the last item, unless copper-containing species (copper-cyanide complexes) are removed, they can form cyanide compounds (e.g. $Cu(CN)_2^{-1}$) which chemically consume cyanide ions $[(CN)^-]$ to form $Cu(CN)_3^{-2}$ in the system. This situation (which involves a continuous consumption of cyanide ions by inert copper-containing complexes) increases the overall operating cost of the gold refining facility under consideration. The presence of copper-cyanide materials can also cause a reduction in operational efficiency at many other stages of the system including electrowinning and smelting steps (if employed). Finally, in the absence of effective treatment and recovery methods involving copper-cyanide complexes, a substantial amount of valuable copper is wasted. The claimed process enables the copper-cyanide complexes of concern to be isolated in a sufficiently complete manner to allow the further treatment of these materials so that elemental copper can be recovered therefrom.

To facilitate a complete overview of the invention and its various embodiments, the following discussion will be divided into sections, with the first section describing the basic gold-leaching process.

A. The Initial Gold Leaching Process

As stated above, the present invention involves a unique, economical, and highly effective method for producing a purified gold product from raw ore which not only contains elemental gold therein, but likewise includes elemental copper. Prior to development of the claimed invention, the processing of copper-containing gold ore presented numerous economic problems including the production of reduced-purity gold, increased reagent consumption, and interference with many operational procedures in the processing system. The present invention solves these problems and enables the rapid and economically-viable treatment of copper-containing gold ore. The initial cyanide-based leaching stage of the treatment process will be substantially the same in all embodiments of the invention. However, to provide a thorough and complete understanding of the claimed system from start to finish, the initial leaching stage will now be described.

With reference to the gold ore processing system 10 schematically illustrated in FIG. 1, a supply of gold ore 12 is initially provided. The present invention shall not be limited to any particular parameters, materials, components, ore grades, and equipment used in connection with the leaching process and system 10. Any cyanide-based leaching procedure can be used provided that an aqueous liquid product is obtained from the ore 12 which contains a gold-cyanide complex therein. However, this invention is primarily directed to the use of gold ore 12 which not only contains elemental gold (Au) therein but likewise includes substantial amounts of elemental copper (Cu). Gold ore 12 of this type originates in many geographic locations including but not limited to Australia, Chile, Philippines, Saudi Arabia, Canada, Argentina, Indonesia, Peru, and Mexico. In a representative and non-limiting embodiment, most gold ore 12 of concern in the claimed invention will contain about 0.0001–0.0005% by weight elemental gold and about 0.1–2% by weight elemental copper therein. However, it is important to note that the invention shall not be restricted to the treatment of gold ore 12 having any particular copper content.

As shown in the embodiment of FIG. 1, the gold ore 12 is provided in the form of rock materials 14 which are configured in a heap or pile 16. The term "rock materials" as used herein may involve discrete portions or "chunks" of rock having an average diameter of about 1–4 inches, crushed/powered rock (e.g. with an average [non-limiting] particle size of about 200 U.S. standard mesh or less), or large sections/deposits of ore, all of which are normally treated at a mine site. This invention and the cyanide treatment processes of concern shall not be restricted to any particular physical characteristics in connection with the gold ore 12, with the discussion of rock materials 14 (and the dimensional parameters listed above) being provided for example purposes. Size reduction of the ore 12 to a desired level (e.g. to create the rock materials 14 having the desired size characteristics as previously described) may be undertaken in a conventional manner using standard equipment including jaw crusher units, attrition mills, and/or roll crusher systems which are known in the art for this purpose. The pile 16 of gold ore 12 is normally of significant size. For example, representative ore piles 16 may typically be about 30–50 ft. tall and will occupy about $1 \times 10^7 – 3 \times 10^7$ ft$^3$ of space, although these values can be varied as needed in accordance with the mine site/processing facility under consideration. In a preferred embodiment, each pile 16 of ore 12 (e.g. rock materials 14) is placed on a pad 20 manufactured of rubber or other composition which is substantially inert relative to the cyanide salts and/or hydrocyanic acid (HCN) materials that are normally encountered in the leaching process.

Thereafter, a leaching solution containing cyanide therein (e.g. a "cyanide-containing leaching solution" 22) which is initially retained within a containment vessel 24 made of stainless steel or other inert material is applied to the pile 16 of ore 12 via tubular conduit 26. The tubular conduit 26 is operatively connected to a spraying assembly 30. The spraying assembly 30 may be of any conventional design which optimally has multiple nozzles 32 associated therewith (FIG. 1). The term "cyanide-containing leaching solution" shall not be restricted to any particular composition provided that it is water-based (e.g. aqueous) and contains "free" (e.g. dissolved) cyanide ions [(CN)$^-$] therein. Many different materials may be used for this purpose including but not limited to aqueous solutions having the following cyanide salts/compositions dissolved therein: sodium cyanide (NaCN), potassium cyanide (KCN), calcium cyanide (Ca(CN)$_2$), gaseous hydrogen cyanide (HCN$_{(g)}$), ammonium cyanide (NH$_4$CN), organic alpha-hydroxy cyanides (e.g. lactonitrile), thiocyanates (e.g. NaSCN, KSCN, or Ca(SCN)$_2$), and/or mixtures thereof. While the cyanide concentration of the leaching solution 22 may be varied in accordance with a wide variety of parameters including the type and character of the gold ore 12 being treated, a representative and preferred leaching solution 22 will contain about 0.1–2% by weight dissolved cyanide-containing compound (e.g. KCN, NaCN, Ca(CN)$_2$, etc.) therein. It should also be noted that the conduit 26 (as well as any of the other conduits in the system 10 as outlined below) may include one or more in-line pumps therein (not shown) if needed in accordance with preliminary pilot studies on the specific processing system under consideration. The particular pump which may be employed for this purpose can be of any conventional type suitable for transporting the materials under consideration including but not limited to centrifugal, positive-displacement, and/or other pumps known in the art.

In most cases, it is desirable and important from a safety and efficiency standpoint to ensure that the pH of the leaching solution 22 be maintained at a level of about 9–11. At pH levels below 9, noxious gases are generated which endanger personnel. At pH levels above 11, recovery of the desired gold-cyanide complex (discussed below) can be hindered. To accomplish this goal as determined by preliminary and routine pilot studies, it may be necessary to periodically test and adjust the pH of the leaching solution 22 prior to and/or during use by adding a selected alkali composition to the solution 22. Preferred compounds suitable for this purpose include calcium oxide (which is also known as "lime" or CaO), as well as NaCO$_3$ and/or NaOH. The alkali composition is schematically shown in FIG. 1 at reference number 34, and is introduced into the system 10 via tubular conduit 36. The amount of alkali material to be used (if necessary) will vary depending on the relative pH of the leaching solution 22, the chemical content of the ore 12 being processed, and other parameters including the specific type of processing system under consideration. The quantity of alkali material (and the general need for such an additive) may therefore be determined in accordance with routine testing procedures involving standard pH analyzing equipment which will provide a continuous monitoring of the leaching solution 22 before and during use thereof. In a representative and non-limiting embodiment, about 0.1–1 g of calcium oxide (CaO) will typically be used per liter of the leaching solution 22 which is formulated as discussed above. Nonetheless, it is important to emphasize that the use of alkali materials (as well as any other additives) in the leaching solution 22 is optional, with the need for such materials again being determined in accordance with preliminary studies on the gold ore 12 being treated and other factors. The same situation exists in connection with the overall amount of leaching solution 22 to be employed in connection with the heap or pile 16 of ore 12. However, in a representative and non-limiting embodiment (which is subject to variation if necessary as determined by preliminary analysis), about 200–500 gallons of the leaching solution 22 having the characteristics listed above will typically be used per ton of ore 12 (in rock or powder form).

The leaching solution 22 is introduced into the pile 16 of rock materials 14 (e.g. gold ore 12) at the top 40 thereof so that the leaching solution 22 is placed in direct physical contact with the ore 12. Thereafter, the leaching solution 22 is allowed to pass downwardly (e.g. percolate) through the pile 16, extracting gold from the rock materials 14 (ore 12) as it passes over and through the ore 12. This process is facilitated by the fairly porous nature of the rock materials 14/ore 12 as discussed above. The resulting liquid product (shown in FIG. 1 at reference number 42) is collected as it exits the pile 16 at the bottom 44 thereof.

At this point, the liquid product 42 will contain unreacted cyanide materials therein (e.g. cyanide ions [(CN)$^-$]), along with (1) a gold-cyanide complex; and (2) a copper-cyanide complex. The term "gold-cyanide complex" shall be defined to encompass a chemical complex containing one or more gold ions therein stoichiometrically combined with one or more cyanide ions [(CN)$^-$]. This complex will typically consist of Au(CN)$_2^{-1}$ (also known as an "aurocyanide ion") which is associated with one or more counter-ions including, for example, Na$^+$ when NaCN is employed in producing the leaching solution 22, K$^+$ when KCN is used, and Ca$^{+2}$ when Ca(CN)$_2$ is involved. The Au(CN)$_2^{-1}$ complex has a high level of stability with a K$_f$ of about 2×10$^{38}$. A typical reaction sequence in which a gold-cyanide complex of the type described above is produced using a selected cyanide-containing leaching solution 22 is as follows:

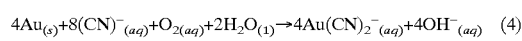

$$4Au_{(s)} + 8(CN)^-_{(aq)} + O_{2(aq)} + 2H_2O_{(l)} \rightarrow 4Au(CN)_2^-{}_{(aq)} + 4OH^-_{(aq)} \quad (4)$$

This reaction is further described in Brown, T. L., et al., *Chemistry, The Central Science*, supra, p. 815. It is again important to emphasize that the reaction listed above will occur in connection with a wide variety of different cyanide-containing leaching solutions, with the present invention not being restricted to the use of any particular materials for this purpose. As discussed in considerable detail below, the gold-cyanide complex which results from the leaching process shown in FIG. 1 is subsequently treated to recover elemental gold therefrom.

However, a discussion of the copper-cyanide complex is also warranted at this point. Regardless of which methods are used to obtain elemental gold from the gold-cyanide complex in the liquid product 42, a number of technical and economic problems can result in the cyanide leaching system 10 when gold ore 12 is processed which contains substantial amounts of elemental copper therein. In all cyanide-based leaching processes of the type illustrated in FIG. 1, the costs associated with the initial cyanide-containing leaching solution 22 represent a substantial portion of the overall operating expense incurred in the processing of gold ore 12. The excessive consumption of cyanide materials will cause a considerable reduction in the operating efficiency of the entire processing system 10. It is therefore a goal of all cyanide-based gold leaching operations to minimize the use of cyanide compositions and avoid excessive losses of this material. However, when copper is present in the gold ore 12 as outlined above, a chemical "side-reaction" occurs which results in the excessive consumption of cyanide ions [(CN)$^-$] from the leaching solution 22. This side-reaction makes fewer cyanide materials available for the leaching of gold. Undesired and excessive cyanide ion consumption which occurs in the system 10 when elemental copper is present in the gold ore 12 takes place in accordance with the following chemical reaction:

$$2Cu_{(s)} + 6(CN)^-_{(aq)} \rightarrow 2Cu(CN)_3^{-2}{}_{(aq)} \qquad (5)$$

This reaction consumes substantial amounts of free cyanide [(CN)⁻] in order to produce a copper-cyanide complex, thereby increasing the overall cyanide requirements in the leaching process. The term "copper-cyanide complex" as used herein shall be defined to involve a chemical complex containing one or more copper ions stoichiometrically combined with one or more cyanide ions [(CN)⁻]. This complex will typically consist of $Cu(CN)_3^{-2}$ (also known as a "cuprocyanide ion") which is associated with one or more counterions including, for example, $Na^+$ when NaCN is employed in producing the leaching solution 22, $K^+$ when KCN is used, and $Ca^{+2}$ when $Ca(CN)_2$ is involved. Much of the copper-cyanide complex $(Cu(CN)_3^{-2})$ which is generated as a result of this reaction passes unaffected through the gold extraction and isolation processes outlined above, and ultimately resides in the "barren" cyanide-containing solution materials which remain after the gold-cyanide complex is removed. This barren solution is normally reused/recycled in treating incoming amounts of additional gold ore 12. However, when the barren solution contains the copper-cyanide complex therein, this material $(Cu(CN)_3^{-2})$ decomposes via oxidation or other processes to $Cu(CN)_2^{-1}$ during exposure to air, bacterial action, and/or sunlight in storage ponds, on heaps 16 of gold ore 12, and the like. This copper-cyanide compound $(Cu(CN)_2^{-1})$ represents a considerable problem in the recycled barren cyanide solution since $Cu(CN)_2^{-1}$ is chemically incapable of extracting gold from gold ore 12 to yield the desired gold-cyanide complex and instead recombines with fresh cyanide ions [(CN)⁻] that are added during the reuse and recycling of the barren solution. As a result, the $Cu(CN)_2^{-1}$ is then reconverted back into the copper cyanide complex described above $(Cu(CN)_3^{-2})$, thus consuming two moles of (CN)⁻. As more copper leaches into the recirculating leaching solution 22 (which occurs during reuse of this material and repeated passage thereof through incoming quantities of gold ore 12), increasingly large amounts of cyanide are irreversibly lost to this decomposition/cyanide consumption cycle. The presence of copper in the gold ore 12 being treated therefore presents significant problems from a functional and economic standpoint.

In summary, the presence of elemental copper in the gold ore 12 being treated ultimately increases cyanide consumption in the system 10 by forming a copper-cyanide complex $(Cu(CN)_3^{-2})$ which can decompose to yield $Cu(CN)_2^{-1}$. The $Cu(CN)_2^{-1}$ in the recycle stream, when "conditioned" by the addition of fresh (CN)⁻ is reconverted to $Cu(CN)_3^{-2}$ resulting in the loss of two moles of (CN)⁻ when the $Cu(CN)_3^{2}$ compound is reformed. This loss (which involves excessive (CN)⁻ reagent consumption) significantly and adversely affects the cost efficiency of the entire gold processing operation.

In addition to excessive cyanide consumption, copper materials within the gold ore 12 will also result in the production of an impure elemental gold product. Additional and more costly refining procedures must therefore be used to solve this problem. Likewise, if the Merrill-Crowe Process is employed (which involves a combination of elemental zinc with the leaching solution 22 containing the gold-cyanide complex therein), extraneous copper-containing materials (e.g. $Cu(CN)_3^{-2}$) in the solution 22 will dramatically reduce the precipitation efficiency of the Merrill-Crowe system by causing zinc passivation, with this term being defined above. Additional zinc will therefore be required which again increases overall production costs. Excessive copper contamination in the liquid product 42 will also reduce the operating efficiency of the smelting process associated with this embodiment by causing prolonged smelting times.

In systems which employ the Activated Carbon Process, copper materials (e.g. copper-cyanide complexes) can substantially inhibit the functional capabilities of the activated carbon, thereby "fouling" this material and causing increased carbon requirements. Current efficiency and consumption are likewise increased in subsequent electrowinning stages when copper materials are not removed from the system 10. Accordingly, the presence of copper-containing species in the liquid product 42 can cause a number of serious problems unless the copper is effectively removed. Regarding the amount of copper-cyanide complex $(Cu(CN)_3^{-2})$ in the liquid product 42 at this point, it will typically contain about $1 \times 10^{31}$ ³–$1 \times 10^{-4}\%$ by weight gold-cyanide complex and about 0.05–1.0% by weight copper-cyanide complex, although the claimed process shall not be restricted to a liquid product 42 having these parameters which will vary in accordance with the type of gold ore 12 being processed and other extrinsic factors.

The liquid product 42 may thereafter pass via tubular conduit 46 into an optional solids filter 50 which is used to remove extraneous particulate matter (e.g. residual ore materials or "gangue") from the liquid product 42. In a preferred embodiment, the solids filter 50 will consist of a backwashable sand bed filter known in the art or other conventional system of comparable design. Solid materials trapped by the solids filter 50 (schematically designated at reference number 52 in FIG. 1) are ultimately routed out of the filter 50 and system 10 for disposal through tubular conduit 54. The use of a solids filter 50 for this purpose is again optional as determined by preliminary pilot studies on the particular liquid product 42 under consideration and its overall solids content.

After passage of the liquid product 42 through the solids filter 50 (if used), the liquid product 42 is ready for further processing in accordance with the unique method of the present invention. However, it is again important to emphasize that all embodiments of the claimed process shall not be restricted to any particular type of initial leaching process, with any procedure being suitable for use herein provided that some type of dissolved cyanide-containing solution is placed in physical contact with the gold ore under consideration. In addition to the "heap leaching" procedure outlined above and illustrated in FIG. 1, the invention is likewise applicable to a procedure known as "vat leaching" Vat leaching basically involves a technique in which the gold ore 12 is placed in large containers or "vats" which are entirely or partially closed (not shown). These vats are discussed in detail above. The gold ore 12 (in the form of rock materials 14 or powder) is then placed in direct physical contact with the leaching solution 22 inside the vat(s). All of the other information provided above regarding heap leaching (including the chemical content of the cyanide-containing leaching solution 22) is equally applicable to vat leaching techniques. Heap or vat leaching facilities are currently in widespread use throughout the United States and in other countries. For example, in 1989, the United States had about eighty heap leach or vat leach operations, with most of them being located in Nevada. Other large leaching operations are currently taking place in Peru, Ecuador, Chile, South Africa, Indonesia, Canada, and elsewhere. Further general information regarding the leaching process of FIG. 1 (and cyanide-based gold leaching in general), as well as various parameters associated with these procedures are presented in U.S. Pat. No. 5,264,192; Thomas, R. (ed.), *E/MJ Operating Handbook of Mineral Processing*, McGraw-Hill, Inc., pp. 22–23 (1977); Clennell, J., *The Cyanide Handbook*, McGraw-Hill, Inc., pp. 102–132 (1915); and Bernard, G. M. "Andacollo Gold Production—Ahead of Schedule and under Budget", *Mining Engineering*, pp. 42–47 (August 1996) which are all incorporated herein by reference.

The completed liquid product 42 containing (1) the gold-cyanide complex; and (2) the copper-cyanide complex is now ready for further processing in accordance with the embodiment of FIG. 1 so that both of these compositions can be separated from each other. It should also be noted at this point that the liquid product 42 may likewise contain other materials therein (e.g. dissolved metal containing-species derived from a number of different metals including silver (Ag), lead (Pb), and the like). The type and amount of these additional materials in the liquid product 42 will depend on the particular ore 12 being treated, although such materials are typically present in very small quantities which shall be considered negligible and of minimal consequence for the purposes of this invention. The liquid product 42 may either be temporarily stored in one or more large outdoor pond-type structures (not shown) or immediately subjected to further processing, depending on the overall capacity of the system 10 as determined by preliminary testing. The unique separation process associated with the gold-cyanide complex and the copper-cyanide complex in the liquid product 42 will now be outlined in detail.

B. The Gold-Copper Separation Process

With continued reference to FIG. 1, the liquid product 42 is routed directly from the pile 16, the solids filter 50 (if used), or a temporary holding pond (if employed) into the separatory system 56 of the present invention via tubular conduits 60, 62. The separatory system 56 generally consists of at least one and preferably multiple nanofiltration membrane units. A single, representative nanofiltration membrane unit 64 is illustrated in schematic format in FIG. 1. However, it should be noted at this point that the present invention shall not be restricted to any specific arrangement or number of nanofiltration membrane units. If multiple membrane units are employed, they may be configured in series, in parallel, or in a combination of both as discussed in greater detail below (along with specific examples). The ultimate arrangement of nanofiltration membrane units in the separatory system 56 will depend on a variety of factors including the chemical character and content of the liquid product 42, the overall size/capacity of the system 10, the incoming flow rate of the liquid product 42, the size of the nanofiltration membrane units under consideration, and other factors as determined by preliminary testing. For example, in applications involving a liquid product 42 having a relatively high incoming flow rate (e.g. exceeding about 1000 GPM or more), the liquid product 42 is preferably divided into a plurality of portions which are passed through a series of nanofiltration membrane units operated in parallel, followed by passage of the liquid product 42 through a series of nanofiltration membrane units operated in series. This technique enables relatively large initial feed streams to be handled and treated in a more rapid and efficient manner without overloading the system 10. In addition, the ultimate number of nanofiltration membrane units in the separatory system 56 will likewise vary (ranging from one to multiple units), again depending on the amount of liquid product 42 to be treated, the concentration of the copper-cyanide complex and gold-cyanide complex in the liquid product 42, the initial flow rate, and other factors. As previously noted, specific examples of multiple nanofiltration membrane systems which are suitable for use herein will be provided below.

The claimed invention shall likewise not be limited to any incoming flow rate in connection with the liquid product 42 as it enters the separatory system 56. Regardless of whether a single or multiple nanofiltration unit system is employed, it is preferred that the liquid product 42 be delivered to the selected separatory system 56 (e.g. nanofiltration membrane unit(s)) at a representative, non-limiting flow rate of about 100–10,000 GPM (gallons per minute), with this parameter being varied as needed in accordance with routine preliminary testing procedures.

However, prior to filtration of the liquid product 42 using the nanofiltration membrane separatory system 56 as discussed in substantial detail below, another important factor merits further consideration. Specifically, at least one antiscalant composition may optionally be added to the liquid product 42 prior to nanofiltration in the separatory system 56. The use of an antiscalant composition is preferred when the liquid product 42 contains substantial amounts of dissolved calcium or other sparingly soluble salts therein. For example, the addition of an antiscalant composition is desirable when the liquid product 42 contains more than about 0.1 g/l of calcium ions therein. Dissolved calcium within the liquid product 42 may come from the ore 12 being treated and/or can result from the use of "hard" water to initially prepare the aqueous leaching solution 22. With reference to FIG. 1, a supply of a selected antiscalant composition (discussed further below) is shown at reference number 66 which is delivered to the liquid product 42 prior to treatment in the nanofiltration membrane separatory system 56 via tubular conduit 70.

The addition of at least one antiscalant composition 66 (FIG. 1) will prevent the formation of calcium precipitates or other sparingly soluble salts (e.g. $CaSO_4$ and/or $CaCO_3$) during nanofiltration. Such precipitates can clog (e.g. foul) the selected nanofiltration membrane(s) in the separatory system 56, thereby reducing the operational efficiency of the entire processing system. The amount of antiscalant composition 66 to be employed will depend on numerous factors, including but not limited to the chemical character of the liquid product 42, the pH of the liquid product 42, the amount of dissolved calcium within the liquid product 42, and other extrinsic factors. In this regard, preliminary pilot tests on the liquid product 42 of interest may be used to determine whether antiscalant compositions are needed and how much antiscalant compositions should be used. However, in a representative and non-limiting embodiment involving a situation in which the use of a selected antiscalant composition 66 is warranted, about $1 \times 10^{-2} – 1 \times 10^{-4}$ grams of the selected antiscalant composition 66 will typically be used per liter of the liquid product 42. Again, this value may be varied as needed. It should also be noted that the antiscalant composition 66 may simply be added to the liquid product 42 in the foregoing amount as a routine practice without conducting preliminary analyses of the calcium ion content thereof.

Numerous materials may be used in connection with the antiscalant composition 66, and the present invention shall not be limited to any particular antiscalant material. Exemplary compounds suitable for use as the antiscalant composition 66 include but are not limited to sodium hexametaphosphate and sodium polyacrylate in water (commercially available from the American Cyanamid Company of Wayne, N.J. (USA) under the name "Cyanamer P-70").

With continued reference to FIG. 1, the specialized treatment process involving the liquid product 42 will now be discussed. As previously indicated, the separatory system 56 uses nanofiltration technology to isolate the desired materials in this case. Nanofiltration is a unique concept which was first recognized and developed in the late 1980s. While most commercially available nanofiltration membranes are proprietary in nature, they all have specific characteristics as described in Lein, L., "Nanofiltration: Trend of the Future!", *Water Conditioning & Purification*, pp. 24–27 (September 1992). Further information regarding nanofiltration is also presented in U.S. Pat. No. 5,476,591 to Green which is incorporated herein by reference. Nanofiltration membranes will typically prevent the passage therethrough of materials (e.g. ions, particles, and the like) which have a size (average diameter) that exceeds about 10–20 angstroms. In contrast, ultrafiltration membranes will typically prevent the passage therethrough of materials having a size (average diameter) exceeding about 50–200 angstroms. Of even greater importance in this case is the substantial difference in filtration capability between nanofiltration membranes and reverse osmosis membranes. Reverse osmosis membranes will normally prevent the passage therethrough of compositions having a size (average diameter) greater than about 2–5 angstroms.

There is a significant and substantial difference between nanofiltration systems and other membrane technologies including reverse osmosis. Regarding separation characteristics, nanofiltration is located between reverse osmosis and ultrafiltration, and fills the "gap" that exists between these two technologies as outlined in Cheryan, M., et al., "Consider Nanofiltration for Membrane Separations", *Chemical Engineering Progress*, pp. 68–74 (March 1994) which is incorporated herein by reference and fully explains the substantial differences between nanofiltration and, for example, reverse osmosis. The significant dissimilarities in capacity and operational ability which exist between nanofiltration membranes and reverse osmosis membranes include many items. For example, according to the above-listed article, nanofiltration membranes effectively operate at lower pressures of about 1.4 MPa/200 psi compared with reverse osmosis membranes which normally have operating pressure requirements exceeding about 4 MPa. Most commercially available nanofiltration membranes also have a very high membrane flux which enables them to operate at relatively low fluid pressures (e.g. 75–200 psi). The term "membrane flux" as used herein is defined as the flow rate/capacity of materials through the selected membrane as a function of the membrane area in, for example, gallons per $ft^2$ per day ("GFD"). There are also differences in the types of materials which can pass through these membranes as discussed in the foregoing article.

The use of one or more nanofiltration membranes in the separatory system 56 of the present invention provides numerous advantages compared with other membrane types including reverse osmosis. These advantages again include but are not limited to lower required operating pressures, higher flux levels, and reduced fouling tendencies. Likewise, it has been discovered in accordance with the present invention that nanofiltration membranes are particularly well-suited (compared with other membrane types) for effectively differentiating between the copper-cyanide complex and the gold-cyanide complex in the liquid product 42 generated within the system 10 so that these materials can be separated from each other. The high degree of separation efficiency achieved by nanofiltration membranes involving copper and gold-containing species results from the ability of these membranes to differentiate between metal ions based on charge, with the scientific basis for this ability not being currently understood. For this reason, nanofiltration membranes are preferred for use in the separatory system 56 of the invention and represent a unique development in the art of the gold processing, especially in the treatment of "impure" copper-containing gold ore 12.

A number of different commercially available nanofiltration membrane units may be employed in the separatory system 56 (e.g. as the nanofiltration membrane unit 64 shown in FIG. 1.) A representative nanofiltration membrane cartridge unit suitable for use herein is produced by Desalination Systems, Inc. of Escondido, Calif. under the name "Desal-5". This membrane unit is typically configured in the form of an elongate cartridge which is illustrated schematically in FIG. 2 at reference number 100. Each cartridge 100 is typically about 40 inches long and preferably between about 4–8 inches in diameter. The cartridge 100 includes a housing 102 having a first end 104 and a second end 106. The first end 104 and the second end 106 are both open so that fluids may pass through the housing 102. In the center of the cartridge 100 is an elongate conduit 110 having numerous openings 112 therethrough. Surrounding the conduit 110 are multiple, spirally-wound layers 114 of filter membrane material which is proprietary in structure and chemical composition. Also associated with the layers 114 of filter membrane material are layers 116 of a porous spacer material (e.g. a proprietary plastic/polymer mesh) and layers 120 of a porous membrane backing material (e.g. also manufactured of a proprietary porous plastic composition) to which the layers 114 of filter membrane material are affixed. In use, the fluid to be treated (e.g. the liquid product 42) enters the first end 104 of the cartridge 100 in the direction of arrow "X". The selected fluid is not allowed to enter the elongate conduit 110 which is designed to receive filtered permeate as described below. As a result, the incoming fluid (liquid product 42) passes between and through the layers 114 of filter membrane material. A retentate is formed between the layers 114 of filter membrane material which consists of materials that cannot pass through the layers 114 (e.g. the copper-cyanide complex in the liquid product 42 as discussed further below). In contrast, liquids and other materials associated therewith (e.g. the gold-cyanide complex of the present invention) which actually pass through the layers 114 of membrane material, layers 116 of spacer material, and layers 120 of backing material are collectively designated as the permeate. The permeate ultimately enters the conduit 110 via the openings 112 therethrough. It should be noted that the permeate flows inwardly toward the conduit 110 in a direction "Y" which is perpendicular to the direction of arrow "X". As a result, the permeate is allowed to leave the conduit 110 at the second end 106 of the cartridge 100 in the direction of arrow "P". The retentate flows along and between the layers 114 of filter membrane material and ultimately leaves the cartridge 100 at the second end 106 thereof in the direction of arrow "R". The flow of retentate in this manner (which is conventionally characterized as "cross-flow" filtration) is facilitated by continuous fluid pressure exerted on the system by incoming fluid materials (e.g. the liquid product 42).

Figure 2:
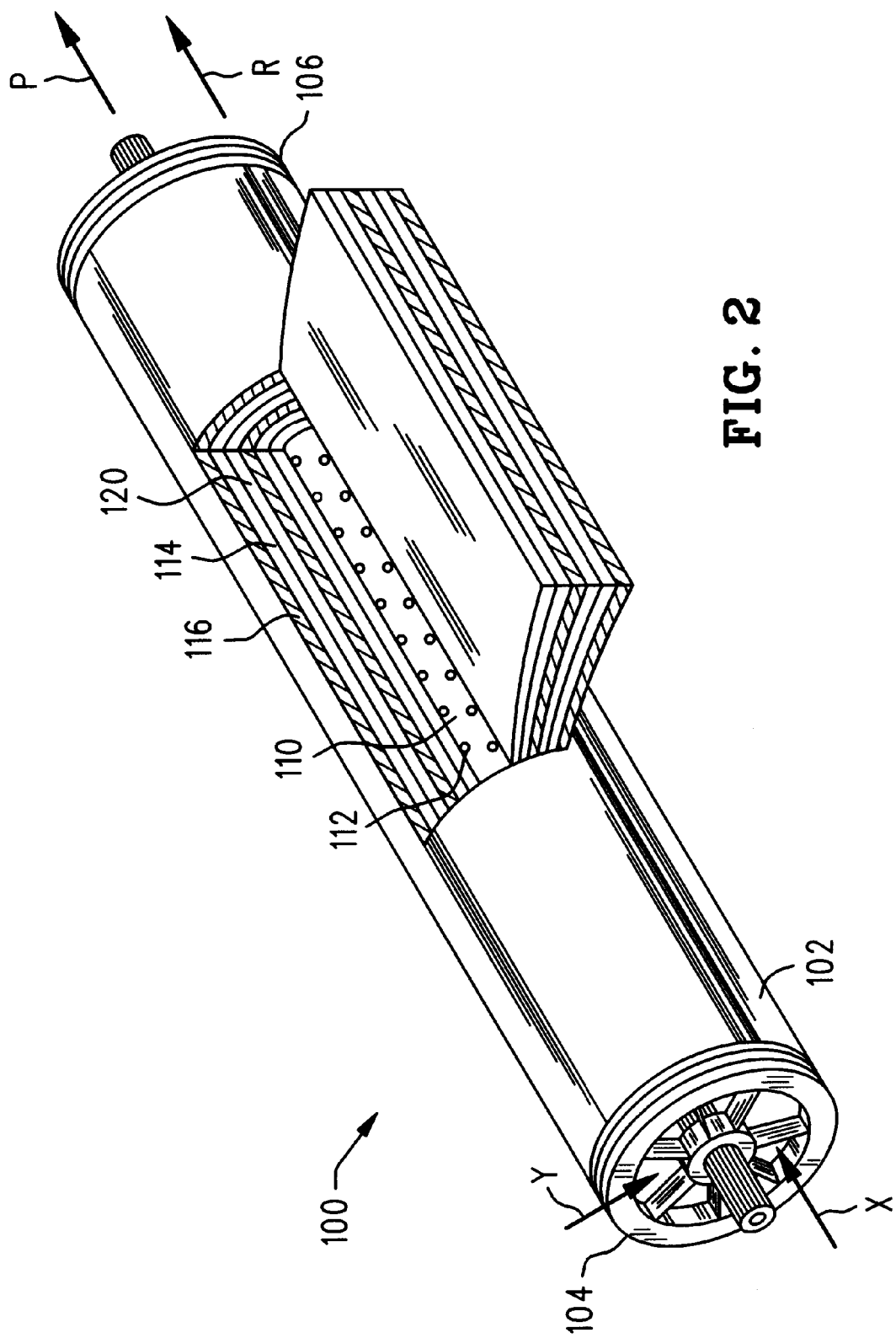
FIG. 2 is a schematic, partially-exploded view of a representative nanofiltration membrane cartridge unit which is suitable for use in the various embodiments of the invention.

As stated above, the cartridge 100 illustrated in FIG. 2 is available from Desalination Systems, Inc. of Escondido, Calif. under the name "Desal-5". However, other commercially-available nanofiltration systems/cartridge units may be used in connection with the present invention including but not limited to those produced by Osmonics, Inc. of Minnetonka, Minn. (USA) under the product designation "B-type TLC"; Hydranautics, Inc. of Oceanside, Calif. (USA) [model 4040-TFV-7450]; and Film Tech, Inc. of Minneapolis, Minn. (USA) [model NF-45]. Accordingly, the claimed invention shall not be restricted to any particular type or arrangement of nanofiltration units. Furthermore, as previously noted, the number of cartridges 100 which function as the nanofiltration membrane unit(s) 64 in the separatory system 56 may be selectively varied, depending on the type and amount of incoming fluid (e.g. liquid product 42) to be treated. For example, if 10,000 gallons of the liquid product 42 having the composition values/ranges listed above are to be treated at an incoming flow rate of about 100 GPM, optimum results will be achieved if 36 "Desal-5" cartridges 100 are used in series, with each cartridge 100 being about 40 inches long and about 8.0 inches in diameter. Likewise, in cases involving a relatively high incoming flow rate (e.g. exceeding about 1000 GFD or more), the liquid product 42 is preferably divided into a plurality of portions which are passed through a series of nanofiltration membrane units operated in parallel, followed by passage of the liquid product 42 through a series of nanofiltration membrane units operated in series. This technique enables relatively large initial feed streams to be handled and treated in a more rapid and efficient manner without overloading the system 10. While a number of different nanofiltration cartridge unit arrangements may be employed for this purpose (with the present invention not being restricted to any specific arrangement), a representative system would involve first dividing the incoming liquid product 42 into two equal fractions. Each fraction would thereafter be treated in a separate "branch" or stage of the nanofiltration separatory system 56. In a preferred embodiment, each stage would include two cartridges 100 (e.g. of the type discussed above including "Desal-5" cartridges) in parallel, followed by two cartridges 100 in series. The retentates and permeates from both "stages" would then be rejoined at the end of the separatory process for further treatment, etc. However, this particular system represents a single, non-limiting embodiment with a number of other nanofiltration systems having different arrangements of cartridge units also being suitable for use herein.

Having presented a specific discussion of nanofiltration membrane technology and its distinctive character relative to other filtration membrane types including reverse osmosis membranes and ultrafiltration membranes, the unique abilities of nanofiltration technology in connection with the claimed process will now be addressed. Specifically, upon delivery of the liquid product 42 to the nanofiltration membrane separatory system 56 (e.g. the nanofiltration membrane unit 64), a retentate 130 is generated which does not pass through the nanofiltration membrane(s) associated with the separatory system 56 (membrane unit 64) and a permeate 132 is produced which does, in fact, flow through the nanofiltration membrane(s) associated with the separatory system 56. In a representative and non-limiting embodiment involving the preferred flow rates indicated above, the permeate 132 will optimally pass through the nanofiltration membrane(s) of the separatory system 56 (e.g. which uses a single nanofiltration unit or multiple units) at a representative membrane flux rate of about 2–20 GFD. In addition, it is desired that the system 10 be capable of processing at least about 100–10,000 gallons of the liquid product 42 per minute which can be accomplished in accordance with the numerical parameters listed herein.

The retentate 130 comprises the copper-cyanide complex therein as discussed above, while the permeate 132 contains the desired gold-cyanide complex, with both of these materials being effectively separated from each other using the nanofiltration membrane separatory system 56 (e.g. the nanofiltration membrane unit 64 shown in FIG. 1.) The retentate 130 is specifically routed out of the separatory system 56 via tubular conduit 134, with the permeate 132 being directed out of the system 56 using tubular conduit 135. The retentate 130 may either be discarded, sent to a suitable storage facility, or (more preferably) reprocessed as discussed in substantial detail below to recover elemental copper therefrom. In this regard, the present invention shall not be restricted to any particular method, process, or use in connection with the retentate 130. Nonetheless, for the reasons discussed above, it is of primary importance that the copper-cyanide complex be isolated and removed from the system 10 in this embodiment. As a result, an elemental gold product of greater purity can be produced since any possible interference with subsequent gold refining stages by the copper-cyanide complex is substantially eliminated upon the removal of this material from the system 10. Likewise, separation of the copper-cyanide complex from the gold-cyanide complex in the liquid product 42 using the techniques discussed above avoids reintroducing the copper-cyanide complex into the system 10 during the subsequent recirculation and recycling of cyanide-containing solutions. Reintroduction of the copper-cyanide complex into the system 10 can cause substantial cyanide losses as outlined in considerable detail above and is therefore undesired.

By using the membrane-based separatory system 56 which involves the application of nanofiltration technology in an entirely unique manner (e.g. in connection with the processing of "impure" copper-containing gold ore 12), the gold-cyanide complex and the copper-cyanide complex can be separated from each other in a highly effective manner. In accordance with this technique, approximately 80–98% of the copper-cyanide complex can ultimately be removed from the liquid product 42 which provides the many benefits listed above. Likewise, the use of nanofiltration technology for this purpose is equally applicable to a wide variety of different cyanide leaching systems and shall not be exclusively restricted to the system 10 shown in FIG. 1.

It should also be noted that, if desired in accordance with preliminary testing procedures, the permeate 132 can optionally be re-filtered (e.g. passed through another nanofiltration stage) to further improve the purity of the permeate 132. This may be accomplished in the embodiment of FIG. 1 by rerouting the permeate 132 back into the nanofiltration separatory system 56 (e.g. the membrane unit 64) via tubular conduit 136 shown in dashed lines in FIG. 1. Alternatively, in situations involving large volumes of permeate 132 which are being generated in a high-capacity system (e.g. which are characterized by flow rates of about 1000 GPM or more), an auxiliary nanofiltration separatory system [not shown] separate from the main separatory system 56 can be employed for this purpose. In a representative and non-limiting embodiment, an exemplary auxiliary system would involve passing the permeate 132 through two nanofiltration cartridges 100 (e.g. of the type discussed above including "Desal-5" cartridges) in parallel, followed by two nanofiltration cartridges 100 in series. However, it is again important to emphasize that the use of an auxiliary separatory system as outlined above is optional and employed on an as-needed basis as determined by many factors including the chemical content of the permeate 132 and the overall operating capacity of the entire system 10.

At this stage, isolation and collection of the gold-cyanide complex (which resides within the permeate 132) is now completed. The gold-cyanide complex can thereafter be treated in any known manner to collect and refine elemental gold therefrom, with the claimed invention not being restricted to any subsequent gold treatment/isolation methods. However, to provide a complete disclosure of the present invention, a number of representative gold isolation techniques will now be discussed.

C. Isolation and Recovery of Elemental Gold From the Membrane Permeate

A number of different approaches exist which may be used to treat the membrane permeate 132 so that elemental gold can be obtained therefrom. Representative, non-limiting processes suitable for this purpose will now be discussed. The first procedure of interest involves a technique known as The Merrill-Crowe Process. The Merrill-Crowe Process (which was initially developed in approximately 1897) is also conventionally known as "zinc cementation/precipitation". Specifically, the permeate 132 (which primarily comprises water in combination with the gold-cyanide complex) is combined with elemental zinc (Zn) in accordance with the following reaction:

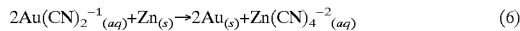

$$2Au(CN)_2^{-1}{}_{(aq)} + Zn_{(s)} \rightarrow 2Au_{(s)} + Zn(CN)_4^{-2}{}_{(aq)} \qquad (6)$$

Various lead salts (e.g. lead acetate and/or lead nitrate) may also be added to the reaction process as needed in order to improved the efficiency of the zinc cementation process. The amount of elemental zinc to be used in this procedure will vary as determined by routine preliminary testing in accordance with numerous factors including the amount of gold-cyanide complex to be treated. However, it is preferred that the quantity of zinc combined with the permeate 132 be carefully controlled so that excesses of zinc are avoided (for economic reasons and to control the production of large amounts of undesired zinc by-products [e.g. zinc-cyanide complexes, namely, $Zn(CN)_4^{-2}$].) In a representative and non-limiting embodiment, approximately 0.003–0.015 g of elemental zinc powder (typically having a particle size of about 40–400 microns) is used per liter of the permeate 132 which contains the gold-cyanide complex therein. Again, this quantity may be varied as needed and desired in accordance with preliminary testing.

With reference to FIG. 1, the Merrill-Crowe Process is schematically illustrated. Specifically, a supply of powdered elemental zinc 138 having the characteristics listed above is combined with permeate 132 via tubular conduits 139, 140. Implementation of this process generates solid elemental gold which resides within a gold-zinc solid sludge reaction product 142. This material is thereafter routed via tubular conduit 146 into a refining system 148 (schematically illustrated in FIG. 1) which is used to obtain purified elemental gold from the reaction product 142. The refining system 148 may involve a number of conventional steps, procedures, and materials which will now be discussed. For example, in a preferred embodiment of the refining system 148, the reaction product 142 is filtered in order to remove residual liquid materials therefrom (which contain free cyanide ions (e.g. $[(CN)^-]$) and very small amounts of the zinc-cyanide complex $[Zn(CN)_4^{-2}]$ discussed above). The resulting liquid fraction (designated at reference number 150 in FIG. 1) can thereafter be re-used in the system 10 as a source of valuable cyanide ions for the treatment of incoming gold ore 12 which contains both elemental gold and copper. Because the copper-cyanide complex (which now resides in the membrane retentate 130) is not present in the liquid fraction 150, free cyanide ions $[(CN)^-]$ in the liquid fraction 150 are not "tied up" and may effectively be reused to treat incoming amounts of gold ore 12. Because the permeate 132 actually includes only about 1–5 ppm of gold therein (which is nonetheless a significant amount in the gold mining industry), a correspondingly small quantity of elemental zinc 138 is employed in this process. As a result, only a minor (e.g. negligible) quantity of the above-listed zinc-cyanide complex is produced. In accordance with this small amount of zinc-cyanide complex (compared with the large quantities of copper-cyanide complex previously in the system 10), as well as chemical differences between the zinc-cyanide complex and the copper-cyanide complex, the liquid fraction 150 containing the zinc-cyanide complex can be re-used without the problems caused by the copper-cyanide complex. In the embodiment of FIG. 1, the valuable cyanide-containing liquid fraction 150 is re-routed back into the initial stages of the system 10 to be combined with fresh quantities of the cyanide-based leaching solution 22, thereby producing considerable cost savings.

The liquid fraction 150 is separated from the solid portions of the reaction product 142 in the refining system 148 using conventional mechanical filtration devices known in the art or decantation/settling processes, and is thereafter routed out of the separation stages of the refining system 148 via tubular conduit 152. The liquid fraction 150 is then transferred via tubular conduit 154 back into the initial stages of the system 10 (e.g. into the vessel 24 containing the leaching solution 22.) This important benefit (which enables impure copper-containing gold ore 12 to be processed in an economical manner) is directly achieved using the unique nanofiltration membrane separatory system 56 and corresponding method of the present invention. By removing the copper-cyanide complex from the system 10 as outlined above, the resulting "barren" cyanide-containing liquid fraction 150 can be reused while avoiding the excess consumption of cyanide which occurs when the copper-cyanide complex is present. Other benefits achieved by removal of the copper-cyanide complex include the production of a final gold product with increased purity levels and the avoidance of interfering side-reactions in subsequent stages of the refining system 148.

The "dewatered" reaction product 142 is thereafter treated in the refining system 148 to isolate and remove elemental gold therefrom. A number of different techniques may again be employed for this purpose within the refining system 148 which shall not be restricted to any single method. For example, after being washed with water to remove residual free cyanide ions and any remaining $Zn(CN)_4^{-2}$ complex, the reaction product 142 may be combined with sulfuric acid ($H_2SO_4$) in the presence of air in the refining system 148 to dissolve excess (unreacted) elemental zinc and other metals including copper and cadmium. This step is discussed in Van Zyl, D. J. A., et al., *Introduction to Evaluation, Design and Operation of Precious Metal Heap Leaching Projects*, supra, p. 150. The remaining solid materials are thereafter washed with water again and dried. If it is determined by preliminary experimental analysis that the resulting solid product contains substantial quantities of mercury (Hg), then the product may be further processed in a conventional mercury retort at about 400° C. to release residual mercury into a condenser assembly which is optimally positioned under water to avoid the release of vaporized mercury into the atmosphere. In the alternative, as discussed in Brown, T. L., et al., *Chemistry,*

*The Central Science*, supra, p. 815, the sludge-like reaction product 142 may instead be heated in air to form zinc oxide (ZnO) from residual elemental zinc which is thereafter sublimed away.

The elemental gold-containing solid product which results from the procedures listed above may then be smelted within the refining system 148 in combination with a selected flux composition that is designed to oxidize any remaining elemental zinc (as well as other residual non-gold metals) and thereby assist in the removal of metal oxides. Representative flux compounds suitable for this purpose include but are not limited to "borax" (e.g. $Na_4B_4O_7.10H_2O$) and silica (e.g. $SiO_2$) in combination. The specific flux materials, as well as the amounts of these compositions to be used in the smelting stage of the refining system 148 will be determined in accordance with preliminary pilot studies on the gold-containing solid product being processed. Likewise, specific information on the use of flux materials in general is again presented in Van Zyl, D. J. A., et al., *Introduction to Evaluation, Design and Operation of Precious Metal Heap Leaching Projects*, supra, p. 150. Addition of the flux materials results in the generation of a borosilicate glass "slag" during smelting with this term being defined above. It should also be noted that, if needed as determined by preliminary pilot testing, feldspar may be added at approximately a 3% by weight level as a viscosity modifier.

Smelting of the reaction product 142 takes place in a conventional furnace within the refining system 148 (e.g. a gas-fired or induction-type furnace system which is known in the art) at a temperature of approximately 1150° C. Finally, after removing the residual "slag" which gravimetrically separates and collects in the furnace, the elemental gold (e.g. characterized as "dore") is extracted from the furnace, thereby completing the production process. The elemental gold product is schematically designated in FIG. 1 at reference number 156. Again, the Merrill-Crowe Process is of conventional design and discussed in the foregoing references including Van Zyl, D. J. A., et al., *Introduction to Evaluation, Design and Operation of Precious Metal Heap Leaching Projects*, supra, pp. 126–127 and 149–150. It should also be noted that while the refining system 148 discussed above basically involves the steps of (1) filtration ["dewatering"]; and (2) smelting, the system 148 may likewise incorporate a number of different steps. The term "refining" as used in connection with system 148 shall therefore encompass a variety of different processes which may be used to yield the final elemental gold product 156.

Another method of interest in treating the membrane permeate 132 having the gold-cyanide complex therein involves a technique known as the Activated Carbon Process. The Activated Carbon Process employs a different approach compared with the Merrill-Crowe Process, with the Activation Carbon Process being schematically illustrated in FIG. 1 within dashed box 170. Specifically, the membrane permeate 132 which contains the gold-cyanide complex is placed in direct physical contact with a supply of activated carbon 172 via tubular conduits 174, 176 (FIG. 1). While not shown in the schematic representation of FIG. 1, this step typically occurs in large column-like structures. The term "activated carbon" as used herein involves particulate carbon materials having an amorphous character with a large surface area and a considerable number of pores or "activation sites". Activated carbon may be obtained from the charring of coconut shells or peach pits at approximately 700–800° C., and will typically have the following optimum parameters (1) surface area=1050–1150 $m^2$/gm; (2) apparent density=0.48 g/cc; (3) particle density=0.85 g/cc; (4) voids in densely packed column=40%; and (5) representative particle sizes=minus 6–plus 16 mesh or minus 12–plus 30 mesh. However, the claimed invention (and activated carbon adsorption processes in general) shall not be restricted to these particular parameters which are provided for example purposes only.

Once the membrane permeate 132 containing the gold-cyanide complex comes in contact with the activated carbon 172, an adsorption process occurs which is not yet entirely understood. Specifically, the gold-cyanide complex (which is defined herein to encompass aurocyanide ions, namely, $Au(CN)_2^{-1}$) is adsorbed onto the surface of the activated carbon 172 using a number of theoretical mechanisms including the possible presence of multiple "surface oxide sites" which enable adsorption to occur. This mechanism, as well as other general information regarding the Activated Carbon Process, is discussed in Arbiter, H., *Gold—Advances in Precious Metals Recovery*, supra, pp. 153–163 (1990); and Van Zyl, D. J. A., et al., *Introduction to Evaluation, Design and Operation of Precious Metal Heap Leaching Projects*, supra, 128–129; 138–149; and 151 which are again incorporated herein by reference. Generally, the supply of activated carbon 172 which is used in this method is operated in a "fluidized bed" mode which may be achieved through the use of a representative flow rate of about 25 gpm/$ft^2$ associated with the carbon-containing column(s) when minus 6–plus 16 mesh carbon 172 is employed. When minus 12–plus 30 mesh carbon 172 is used, a flow rate of about 15 gpm/$ft^2$ is preferred. Both of these parameters will typically result in a bed expansion of about 60%. While this embodiment of the claimed invention shall not be restricted to any particular amount of activated carbon 172 (which will be determined in accordance with routine preliminary testing), a representative and non-limiting example will involve the use of about 2.5–10 g of activated carbon 172 (having the physical characteristics listed above) per liter of the permeate 132.

Regardless of which mechanism ultimately results in adsorption of the gold-cyanide complex on the activated carbon 172, this approach effectively removes the gold-cyanide complex from the permeate 132 and generates a gold-containing carbon product 180 schematically illustrated in FIG. 1. The gold-containing carbon product 180 consists of the carbon 172 having the gold-cyanide complex combined therewith. This process also results in the generation of a "barren" (e.g. stripped) liquid fraction 182 which contains substantial amounts of water and free cyanide ions [$(CN)^-$], but lacks the copper-cyanide complex and gold-cyanide complex therein. This liquid fraction 182 can subsequently be recycled and reused to treat incoming amounts of gold ore 12 which provides a substantial conservation of resources and considerable economic advantages. In the embodiment of FIG. 1, the valuable cyanide-containing liquid fraction 182 is initially separated from the gold-containing carbon product 180 using conventional mechanical filtration devices or known decantation/settling processes. The liquid fraction 182 is then collected and transferred away from the remaining "dewatered" gold-containing carbon product 180 via tubular conduit 184. The liquid fraction 182 is subsequently re-routed back into the initial stages of the system 10 to be combined with fresh quantities of the cyanide-based leaching solution 22, thereby producing considerable cost savings. As shown in FIG. 1, the liquid fraction 182 is routed via tubular conduit 186 back into the initial stages of the system 10 (e.g. into the vessel 24 containing the fresh leaching solution 22.) This important benefit (which enables impure copper-containing gold ore 12 to be processed in an economical manner) is directly achieved using the specialized nanofiltration membrane separatory system 56 and corresponding method of the present invention as discussed above. By removing the copper-cyanide complex from the system 10, the resulting "barren" cyanide-containing liquid fraction 182 can be reused while avoiding the excess consumption of cyanide which occurs when the copper-cyanide complex is present. Other benefits achieved by removing the copper-cyanide complex include the production of a final gold product with increased purity levels and the avoidance of interfering side-reactions in subsequent stages of the refining process.

Next, the "dewatered" gold-containing carbon product 180 is filtered again to remove residual liquid materials therefrom, followed by "desorption" or removal of the gold-cyanide complex from the carbon product 180. This is accomplished by using a selected eluant solution which is placed in direct physical contact with the gold-containing carbon product 180. With reference to FIG. 1, a supply of eluant solution 190 is combined with (e.g. passed through) the gold-containing carbon product 180 via tubular conduit 192. A representative eluant solution suitable for this purpose includes but is not limited to a solution of NaOH— NaCN (e.g. optimally about 0.5–1.0% by weight NaOH and about 0.1–0.3% by weight NaCN containing approximately 20% ethyl alcohol) as specifically discussed in Van Zyl, D. J. A., et al., *Introduction to Evaluation, Design and Operation of Precious Metal Heap Leaching Projects*, supra, p. 139. This solution is likewise heated in a preferred embodiment to a temperature of about 77–120° C. The claimed invention shall not be restricted to any particular amounts of eluant solution 190 which shall be determined in accordance with preliminary tests on the gold-containing carbon product 180 being treated. However, in a representative and non-limiting embodiment, approximately 2–4 liters of the eluant solution 190 are typically used per kg of the gold-containing carbon product 180 (which this amount being subject to adjustment as needed).

It is theorized that cyanide ions [$(CN)^-$] in the eluant solution 190 described above effectively replace/exchange the adsorbed aurocyanide ions (gold-cyanide complex) which are released into the eluant solution 190. The resulting gold-containing eluant product 196 (which is in the form of a liquid and comprises the "released" gold cyanide-complex therein) is then collected from the "stripped" carbon product 180 via tubular conduit 200 and further processed to recover elemental gold therefrom. The remaining "stripped" carbon product [not shown] can be discarded or regenerated using conventional methods as discussed in Arbiter, H., *Gold— Advances in Precious Metals Recovery*, supra, pp. 159–160.

At this point, the gold-containing eluant product 196 is transferred via tubular conduit 202 to a refining system 204 which is schematically shown in FIG. 1. The refining system 204 (which may involve a number of different treatment steps of conventional design) enables the recovery of elemental gold from the eluant product 196. Accordingly, this embodiment of the invention shall not be restricted to any particular methods, techniques, or processing equipment in connection with the refining system 204. For example, gold isolation, collection, and recovery within the refining system 204 may be accomplished using zinc precipitation in accordance with the Merrill-Crowe Process as outlined above, although conventional electrowinning methods are preferred as part of the refining system 204. Electrowinning is discussed in Van Zyl, D. J. A., et al., *Introduction to Evaluation, Design and Operation of Precious Metal Heap Leaching Projects*, supra, pp. 143–148 and 151 which is again incorporated herein by reference. While electrowinning is a known procedure that has been employed in the mining industry for decades, the specific details of this process will now be summarized. First, an electrowinning "cell" [not shown] is provided which includes one or more cathodes and anodes therein. Both of these elements are in fluid communication with the gold-containing eluant product 196 which is supplied to the cell housing having the cathodes and anodes therein. A direct current power supply is then operatively connected to the cathodes and anodes in each cell which causes the desired metal in solution (e.g. elemental gold in the gold-containing eluant product 196) to be directly deposited onto the cathodes. This process shall not be restricted to any particular materials used in connection with the cathodes and anodes, with a wide variety of conventional compositions being suitable for this purpose. In a representative and non-limiting embodiment, cathodes manufactured from steel wool (e.g. positioned in a plastic frame or wrapped around a stainless steel spool) and anodes produced from stainless steel, carbon, or titanium can be employed. Many different sizes, shapes, and overall design configurations may be selected in connection with the cathodes/anodes, with the claimed process (and the electrowinning procedure in general) not being restricted to any particular structures and physical parameters. While the power required for electrowinning will vary in accordance with many factors including the particular type of cell(s) involved, the gold concentration in the gold-containing eluant product 196, and the construction materials associated with the cathodes/anodes, a representative system will involve the application of approximately 2.5 volts between the cathodes and anodes in an exemplary electrowinning cell.

Once the electrowinning process is completed, the elemental gold-containing cathodes are removed from the system and treated to recover elemental gold therefrom. The cathodes at this stage may contain up to about 50% or more gold thereon (e.g. up to about 100 oz. of elemental gold per lb. of cathode if steel wool is involved). To process the cathodes, they may initially be placed in contact with sulfuric acid ($H_2SO_4$) in an optional pretreatment step which is designed to dissolve residual non-gold metals including copper, iron, and the like. The need for a sulfuric acid pretreatment stage is typically determined in accordance with preliminary pilot studies on the electrowinning products (e.g. cathodes) under consideration. If the cathodes contain substantial amounts of mercury (which will not usually be removed by sulfuric acid treatment), they may be subjected to conventional retort processes as discussed above. The cathodes are then smelted in combination with one or more selected flux compositions which are again designed to oxidize residual non-gold metals and thereby assist in the removal of metal oxides. Representative flux materials suitable for this purpose include but are not limited to "borax" (e.g. $Na_4B_4O_7.10H_2O$) and silica (e.g. $SiO_2$) in combination. The specific flux compositions and the amounts of these materials to be used in the smelting process will be determined in accordance with preliminary pilot studies on the gold-containing cathode materials being treated. More detailed information regarding the use of flux materials for this purpose is presented in Van Zyl, D. J. A., et al., *Introduction to Evaluation, Design and Operation of Precious Metal Heap Leaching Projects*, supra, pp. 150–151. Addition of the flux materials during smelting will result in the production of a borosilicate glass "slag" with this term being defined above. It should also be noted that, if needed as determined by preliminary testing, feldspar may be added at approximately a 3% by weight level as a viscosity modifier.

The refining system 204 further includes a smelting stage in which each cathode is smelted in a conventional furnace (e.g. a gas-fired or induction-type furnace system that is known in the art) at a temperature of approximately 1150° C. After removing the residual "slag" which gravimetrically separates and collects in the furnace, the elemental gold (e.g. characterized as "dore") is collected from the furnace, thereby completing the production process. The completed elemental gold product is schematically shown at reference number 206 in FIG. 1. Again, more detailed information regarding the Activated Carbon Process is described in the references cited above. It should also be noted that, while the refining system 204 in the present embodiment involves the steps of (1) electrowinning; and (2) smelting, the system 204 may likewise incorporate a number of different steps. The term "refining" as used in connection with system 204 shall therefore encompass a variety of different processes which may be used to yield the final elemental gold product 206.

Both the Merrill-Crowe Process and the Activated Carbon Process constitute established procedures for collecting and recovering gold-containing species from cyanide-based leaching solutions (e.g. the membrane permeate 132). It is likewise important to emphasize that the present invention shall not be restricted to any particular gold collection/isolation techniques. Instead, the claimed process is prospectively applicable to any method for recovering elemental gold from the membrane permeate 132. In addition to the Merrill-Crowe Process and the Activated Carbon Process (which are both preferred), other representative methods which may be employed to collect and isolate gold-cyanide complexes, following by additional purification to yield elemental gold include (1) solvent extraction procedures which use alkyl phosphorus esters, as well as primary, secondary, tertiary, and/or quaternary amines (alone or combined with phosphine oxides, sulfones, and/or sulfoxides) to extract gold-cyanide complex materials from leaching solutions; and (2) ion exchange methods and compositions (e.g. resins) in which aurocyanide ions are extracted from leaching solutions, with representative elution materials suitable for use with these compositions including sodium hypochlorite, zinc cyanide, thiocyanate, a mixture of thiocyanate/dimethyl formamide ("DMF"), and the like. Exemplary ion exchange resins which may be employed for this purpose include those sold under the trademark DOWEX and others which are commercially available from the Dow Chemical Company of Midland, Mich. (USA). Both of these gold isolation methods (combined with conventional electrowinning and smelting processes) represent alternative methods which may be used to isolate and collect elemental gold from the membrane permeate 132. These alternative techniques are discussed in Arbiter, H., *Gold—Advances in Precious Metals Recovery*, supra, pp. 164–185.

D. Isolation and Recovery of Elemental Copper From the Membrane Retentate

Finally, in accordance with the present invention, the membrane retentate 130 (which contains the copper-cyanide complex) may be handled in two different ways. First, it can be disposed of by transfer to a waste dump site or other collection facility. Alternatively, it can be processed to recover elemental copper therefrom. A number of different methods exist for accomplishing this goal, with the claimed invention not being restricted to any particular procedure for this purpose. The term "treating" as used in connection with this optional stage is therefore applicable to a wide variety of refining processes. Specific methods for accomplishing this goal include but are not limited to the methods discussed below.

As shown in FIG. 1, if subsequent treatment of the membrane retentate 130 is desired, it can be routed via tubular conduit 210 into a refining system 212 so that a final elemental copper product 214 can be generated. The refining system 212 may involve the addition of a selected acid (e.g. sulfuric acid [$H_2SO_4$]) to the membrane retentate 130 which causes a precipitation reaction to occur wherein the copper-cyanide complex is precipitated as solid (stable) CuCN, with "free" cyanide ions [$(CN)^-$] being converted to $HCN_{(aq)}$. The basic reaction associated with this process is as follows:

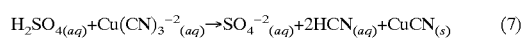
$$H_2SO_{4(aq)} + Cu(CN)_3^{-2}{}_{(aq)} \rightarrow SO_4^{-2}{}_{(aq)} + 2HCN_{(aq)} + CuCN_{(s)} \quad (7)$$

This procedure (which involves one example of a process which may be employed within the refining system 212) is specifically discussed in U.S. Pat. No. 996,170 which is incorporated herein by reference. The solid CuCN may thereafter be treated in accordance with a number of conventional methods to obtain the final elemental copper product 214. For example, representative procedures for achieving this goal include reduction-roasting with $H_2$ gas to yield a "copper sand" that is thereafter smelted.

Alternatively, another procedure which may be employed in connection with the refining system 212 involves combining the membrane retentate 130 with a selected acid (e.g. sulfuric acid [$H_2SO_4$]) and sodium sulfide ($Na_2S$) to yield a $Cu_2S$ precipitate in accordance with the following reaction:

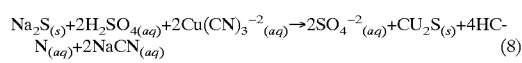
$$Na_2S_{(s)} + 2H_2SO_{4(aq)} + 2Cu(CN)_3^{-2}{}_{(aq)} \rightarrow 2SO_4^{-2}{}_{(aq)} + CU_2S_{(s)} + 4HCN_{(aq)} + 2NaCN_{(aq)} \quad (8)$$

The $Cu_2S$ precipitate may then be smelted to obtain the final elemental copper product 214 (FIG. 1). Further information regarding this particular process is outlined in U.S. Pat. No. 778,348 which is also incorporated herein by reference.

In summary, the present invention involves a unique and highly-efficient method for separating gold-cyanide complexes from copper-cyanide complexes in a gold processing operation. The claimed method is highly versatile and provides the following important benefits: (1) the ability to process impure, copper-containing gold ore in an economical manner without the excessive consumption of cyanide compositions (e.g. free cyanide [$(CN)^-$]); (2) an improvement in the operating efficiency of the entire gold processing system by reducing cyanide reagent costs; (3) the decreased consumption of other reagents in the system including activated carbon and zinc (depending on the particular recovery system under consideration); (4) a reduction in electricity consumption (if electrowinning is part of the overall processing system); (5) improved conservation of resources and reduced waste generation which collectively provide important environmental benefits; (6) a reduction in the amount of smelting time that is needed to yield an elemental gold product; (7) the ability to retain, purify, and collect elemental copper from the gold ore 4 which can be sold at considerable economic benefit; (8) a high level of versatility and applicability to a wide variety of different cyanide-based processing methods; (9) improved gold purity levels in connection with the gold product "dore"; and (10) a general improvement in the simplicity, effectiveness, and efficiency of the gold production system. For these reasons and the other factors outlined below, the present invention and its various embodiments represent a significant advance in the art of gold production.

Having herein described preferred embodiments of the invention, it is anticipated that suitable modifications can be made thereto by individuals skilled in the relevant art which nonetheless remain within the scope of the invention. For example, unless otherwise indicated herein, the invention shall not be limited to any particular structures, components, and hardware in connection with the claimed processes. Likewise, this invention shall not be restricted to any specific cyanide based leaching procedures or any refining methods involving the isolation of elemental gold and/or elemental copper from mined ore. The present invention shall therefore only be construed in accordance with the following claims:

The invention that is claimed is:

1. A method for separating and recovering gold from an excavated gold-bearing ore, comprising:

providing a supply of an ore comprising both gold and copper therein;

placing said ore in contact with a leaching solution comprising cyanide therein, said leaching solution extracting said gold and said copper from said ore when said leaching solution comes in contact with said ore to generate a liquid product comprising a monovalent gold-cyanide complex and a multivalent copper-cyanide complex therein, wherein at least most of said copper in said liquid product is in the form of the multivalent copper-cyanide complex and said liquid product has a pH ranging from about pH 9 to about pH 11;

providing at least one nanofiltration membrane, said nanofiltration membrane preventing passage of said copper-cyanide complex therethrough while allowing passage of said gold-cyanide complex; and delivering at least a portion of said liquid product to said nanofiltration membrane so that said liquid product flows onto said nanofiltration membrane to produce a retentate which does not pass through said nanofiltration membrane and a permeate which passes through said nanofiltration membrane, said retentate comprising at least most of said copper-cyanide complex and said permeate comprising at least most of said gold-cyanide complex, said gold-cyanide complex being separated from said copper-cyanide complex by said nanofiltration membrane.

2. The method of claim 1, wherein said delivering of said liquid product to said nanofiltration membrane occurs at a flow rate of about 100–10,000 GPM.

3. The method of claim 1, wherein said permeate passes through said nanofiltration membrane at a membrane flux rate of about 2–20 GFD.

4. The method of claim 1, wherein said liquid product comprises from about $1\times10^{-3}$% by weight said gold-cyanide complex and about 0.05–1.0% by weight said copper-cyanide complex.

5. The method of claim 1, further comprising the step of treating said permeate to recover elemental gold therefrom.

6. The method of claim 1, further comprising the step of treating said copper-cyanide complex to recover elemental copper therefrom.

7. The process of claim 1, wherein the nanofiltration membrane has an electrical charge to repel the dissolved multivalent copper-cyanide complex and pass the dissolved gold-cyanide complex.

8. The process of claim 1, further comprising recovering the gold-cyanide complex from the permeate by at least one of the following techniques: cementation, ion exchange, electrolysis, solvent exchange, and adsorption.

9. The process of claim 1, further comprising recovering the copper from the retentate.

10. The process of claim 9, wherein the retentate includes cyanide and further comprising recycling the cyanide in the retentate after the recovering step.

11. The process of claim 10, further comprising:

contacting the retentate with an acid to convert cyanide into HCN and precipitate a copper-containing compound;

converting the copper-containing compound into elemental copper.

* * * * *